United States Patent [19]

Hayashi et al.

[11] E Patent Number: Re. 31,985

[45] Reissued Date of Patent: Sep. 17, 1985

[54] AQUEOUS DISPERSION TYPE THERMOSETTING COATING COMPOSITION

[75] Inventors: Masaaki Hayashi, Tokyo; Hiroharu Sasaki, Yamato; Kazuyoshi Tsuneta, Yokohama, all of Japan

[73] Assignee: Dai Nippon Toryo Co, Ltd., Japan

[21] Appl. No.: 407,284

[22] Filed: Aug. 11, 1982

Related U.S. Patent Documents

Reissue of:

[64] Patent No.: 4,296,014
Issued: Oct. 20, 1981
Appl. No.: 104,447
Filed: Dec. 17, 1979

[30] Foreign Application Priority Data

| | | | |
|---|---|---|---|
| Oct. 26, 1978 | [JP] | Japan | 53-132000 |
| Dec. 19, 1978 | [JP] | Japan | 53-156653 |
| Dec. 26, 1978 | [JP] | Japan | 53-164179 |

[51] Int. Cl.[4] ..... C08L 67/06
[52] U.S. Cl. ..... 523/501; 523/504
[58] Field of Search ..... 523/501

[56] References Cited

U.S. PATENT DOCUMENTS

| | | | |
|---|---|---|---|
| 3,687,883 | 8/1972 | Korf | 260/29.6 NR |
| 3,950,287 | 4/1976 | Coats | 260/29.6 NR |
| 4,017,434 | 4/1977 | Suzui et al. | 526/322 |
| 4,065,415 | 12/1977 | Christenson | 260/29.6 NR |
| 4,065,416 | 12/1977 | Christenson | 260/29.6 NR |
| 4,116,903 | 9/1978 | Lietz | 260/29.6 NR |
| 4,177,179 | 12/1979 | Kurihara | 260/29.6 NR |

FOREIGN PATENT DOCUMENTS

| | | |
|---|---|---|
| 1959599 | 6/1972 | Fed. Rep. of Germany . |
| 1044610 | 10/1966 | United Kingdom . |
| 1509417 | 5/1978 | United Kingdom . |

OTHER PUBLICATIONS

Encyclopedia of Polymer Science and Technology, Title page and p. 130.

The Condensed Chemical Dictionary, Title page and pp. 758 and 759.

*Primary Examiner*—Paul R. Michl
*Attorney, Agent, or Firm*—Jacobs & Jacobs

[57] ABSTRACT

Disclosed in an aqueous dispersion type thermosetting coating composition which comprises fine thermosetting resin particles composed of (A) a polyester resin having a specific hydroxyl value and (B) a copolymer resin, which are dispersed in the presence of (C) a surface active agent and/or a thickener in (D) a necessary amount of water.

30 Claims, No Drawings

AQUEOUS DISPERSION TYPE THERMOSETTING COATING COMPOSITION

Matter enclosed in heavy brackets [ ] appears in the original patent but forms no part of this reissue specification; matter printed in italics indicates the additions made by reissue.

BACKGROUND OF THE INVENTION (1) Field of the Invention

The present invention relates to a novel aqueous dispersion type thermosetting coating composition. More particularly, the present invention relates to an aqueous dispersion type thermosetting coating composition which is excellent in storage stability and free of yellowing and which provides a coating excellent in gloss, smoothness, flash rusting prevention, corrosion resistance and water resistance without such defects and popping when it is baking temperatures of a relatively broad range.

(2) Description of the Prior Art

Recently, development of paints and coating methods causing no environmental pollution has been desired, and the use of powdery paints and aqueous paints has been expanding steadily. These paints have important characteristics and merits, but they still include various defects and disadvantages as well.

More specifically, the use of powdery paints involves various difficulties. For example, special coating equipment must be used for performing the coating operation using powdery paints, and hence, the adaptability of powdery paints to the coating operation is much lower than that of conventional solvent type paints. Moreover, coatings formed from these powdery paints are inferior in smoothness and appearance, and it is difficult to form thin coating films having a thickness smaller than 50μ.

In the field of aqueous paints of the water-soluble type, since it is impossible to form paints having a high solid concentration, it is impossible to form thick coatings by one coating operation. Furthermore, because of the presence of a number of hydrophilic groups introduced to render the base resin water-soluble, the durability of the resulting coatings is very poor.

Paints of the aqueous dispersion type, called "latex paints" or "emulsion paints" have long been known (see, for example, U.S. Pat. No. 2,904,523, No. 2,994,676, No. 3,002,940, No. 3,025,252, No. 3,170,888, No. 3,244,542, No. 3,657,175, No. 3,687,885, No. 3,839,254 and No. 3,926,874). In these aqueous latex or emulsion paints, since surface active agents are used in large quantities, the resulting coatings are insufficient in water resistance, chemical resistance and the like.

As paints overcoming these defects and disadvantages, there have been developed slurry paints (aqueous dispersion type paints) which are formed by suspending a powdery resin in water and are used in the same manner as aqueous paints.

Paints of this type comprise an aqueous dispersion medium and a particulate resin having a size of about 0.5 to about 80μ, which is dispersed in the aqueous medium at a solid concentration of 20 to 70% by weight.

As the coating method for these slurry paints, there can be mentioned, for example, a method in which the paint is spray-coated on the surface of an article to be coated, water is evaporated and the resin component is cured to form a coating (see U.S. Pat. No. 3,787,230) and a method in which an aqueous dispersion of particles of a nylon resin is spray-coated on an article maintained at a temperature higher than 100° C. to form a coating (see U.S. Pat. No. 2,972,552). As known paints to be used for these coating methods, there can be mentioned, for example, (i) a paint comprising particles of a chlorinated polyester resin having a size smaller than 200 mesh, which are dispersed in water (see U.S. Pat. No. 3,089,783), (ii) a paint comprising particles of a chlorinated polyester polymer dispersed in water containing a surface active agent, an ester of a polyhydric alcohol with a lower aliphatic monocarboxylic acid, an alkaline water softener and a lower aliphatic alcohol (see U.S. Pat. No. 3,446,652), (iii) a slurry paint comprising particles of a resin selected from acrylic resins, epoxy resins, polyester resins, amino resins and polyurethane resins and a water-soluble thickener (see U.S. Pat. No. 3,907,737), (iv) a slurry paint comprising as the binder particles of a powder thermosetting acrylic resin (see U.S. Pat. No. 3,904,795), (v) a slurry paint comprising a reactive flow adjusting agent having a specific structure (see U.S. Pat. No. 4,122,055) and (vi) a slurry paint comprising an aqueous medium, resin particles having a size of 0.5 to 80μ and an aluminum pigment (see British Pat. No. 1,517,834).

As the process for preparing these slurry paints, there are known a process comprising dissolving a resin in a water-soluble solvent, for example, an alcohol such as methanol or ethanol, a ketone such as acetone or diacetone alcohol, an ester such as ethyl lactate or ethylene glycol monomethyl ether acetate or an ether such as ethylene glycol monoethyl ether, and adding the resulting solution to water being agitated at a high speed to precipitate resin particles in water (see U.S. Pat. No. 3,737,401), and a process comprising pulverizing a solid resin according to an ordinary pulverization method and dispersing the pulverized resin in water.

Slurry paints prepared according to these processes are characterized in that they can be applied at a solid concentration as high as about 40 to about 60% by weight, the coating operation can be accomplished by using a conventional coating apparatus for solvent dilution type paints and the only volatile component contained in the paint is the water that is used as the dispersion medium. Furthermore, since this aqueous dispersion medium contains no soluble component, conserving of resources can be attained and environmental pollution can be prevented. Because of these advantages and merits, it is expected that demands for paints of this type will increase remarkably from now on.

As the resin component that is used for these slurry paints, there are known acrylic resins, polyester resins, epoxy resins and alkyd resins. From the viewpoints of storage stability of paints and smoothness and finish appearance of the resulting coatings, acrylic resins and polyester resins are considered preferable among these resins. According to the type of the cross-linking reaction, these resins are classified as self-curing resins and resins cross-linkable with the aid of a cross-linking agent or curing agent. As the cross-linking or curing agent, there have heretofore been used melamine resins and blocked isocyanate compounds. Furthermore, epoxy resins are sometimes used in combination with such cross-linking or curing agents so as to improve the corrosion resistance.

When slurry paints comprising a melamine resin as the cross-linking agent are used, in case of thick coatings, popping is caused at the baking step and the adaptability to the coating workability is poor. In this case, therefore, the coating operation should be repeated several times to obtain a coating which is as thick as desired. The combined use of such melamine resin with a urethane (blocked isocyanate compound) has been proposed as means for preventing popping, but this proposal is defective in that yellowing is readily caused when baking is carried out at a high temperature (see Japanese Patent Application Laid-Open Specifications No. 112428/75 and No. 108433/77).

Since slurry paints comprise water as the dispersion medium, if they are directly applied to an iron plate such as a soft steel plate, as in the case of conventional aqueous paints, an undesirable phenomenon of flash rusting which is not observed in solvent type paints, is caused. In order to prevent this undesirable phenomenon, a flash rusting-preventing agent or the like is frequently incorporated into slurry paints as in the case of aqueous paints. However, the storage stability or the like is adversely affected by the use of such flash rusting-preventing agent and the use of such flash rusting-preventing agent is not preferred.

BRIEF SUMMARY OF THE INVENTION

The present invention relates to a novel aqueous dispersion type thermosetting coating composition. More particularly, the present invention provides an aqueous dispersion type thermosetting coating composition which is excellent in storage stability and free of yellowing and which produces a coating excellent in gloss, smoothness, flash rusting prevention, corrosion resistance and water resistance without such defects as popping when it is baked at baking temperatures of a relatively broad range.

The aqueous dispersion type thermosetting coating composition according to the present invention comprises fine thermosetting resin particles composed of (A) a polyester-modified vinyl resin having a specific hydroxyl value, which is formed by graft-polymerizing (i) an unsaturated polyester resin with (ii) an $\alpha,\beta$-monoethylenically unsaturated monomer and, if necessary, with (iii) an $\alpha$-$\beta$, monoethylenically unsaturated monomer containing a phosphoric acid group and (B) a cross-linkable copolymer resin derived from a mixture containing (iv) an N-alkoxymethylated monomer of an $\alpha,\beta$-monoethylenically unsaturated carboxylic acid amide, said fine resin particles being dispersed in the presence of (C) a surface active agent and/or a thickener in (D) a necessary amount of water.

In accordance with another embodiment of the present invention, there is provided an aqueous dispersion type thermosetting coating composition comprising fine thermosetting resin particles composed of (A) a polyester-modified vinyl resin having a specific hydroxyl value, which is formed by graft-polymerizing (i) an unsaturated polyester resin with a monomer mixture containing (iv) an N-alkoxymethylated monomer of an $\alpha$, $\beta$-monoethylenically unsaturated carboxylic acid amide and (B) a phosphoric acid group-containing copolymer derived from a monomer mixture containing (iii) an $\alpha,\beta$-monoethylenically unsaturated monomer containing a phosphoric acid group, said fine resin particles being dispersed in the presence of (C) a surface active agent and/or a thickener in (D) a necessary amount of water.

More specifically, in accordance with one fundamental aspect of the present invention, there is provided an aqueous dispersion type thermosetting coating composition [I] comprising a fine thermosetting resin particles composed of (A) 5 to 90% by weight of a polyester-modified vinyl resin having a hydroxyl value of 30 to 200, which is formed by graft-polymerizing (i) 5 to 50% by weight of an unsaturated polyester resin with (ii) 95 to 50% by weight of at least one $\alpha,\beta$-monoethylenically unsaturated monomer and (B) 95 to 10% by weight of a cross-linkable copolymer resin derived from a monomer mixture comprising (iv) an N-alkoxymethylated monomer of an $\alpha,\beta$-monoethylenically unsaturated carboxylic acid amide and (ii) at least one $\alpha,\beta$-monoethylenically unsaturated monomer, (C) a surface active agent and/or a thickener in an amount of 0.01 to 1.0% by weight based on said resin particles and (D) a necessary amount of water.

In accordance with another fundamental aspect of the present invention, there is provided an aqueous dispersion type thermosetting coating composition [II] comprising fine thermosetting resin particles composed of (A) 5 to 90% by weight of a polyester-modified vinyl resin having a hydroxyl value of 30 to 200, which is formed by graft-polymerizing (i) 2 to 50% by weight of an unsaturated polyester resin with (ii) 95 to 40% by weight of at least one $\alpha,\beta$-monoethylenically unsaturated monomer and (iii) 0.01 to 10% by weight of an $\alpha,\beta$-monoethylenically unsaturated monomer containing a phosphoric acid group and (B) 95 to 10% by weight of a cross-linkable copolymer resin derived from a monomer mixture comprising (iv) an N-alkoxymethylated monomer of an $\alpha,\beta$-monoethylenically unsaturated carboxylic acid amide and (ii) at least one $\alpha,\beta$-ethylenically unsaturated monomer, (C) a surface active agent and/or a thickener in an amount of 0.01 to 1.0% by weight based on said resin particles and (D) a necessary amount of water.

In accordance with still another fundamental aspect of the present invention, there is provided an aqueous dispersion type thermosetting coating composition [III] comprising fine thermosetting resin particles composed of (A) 15 to 95% by weight of a polyester-modified vinyl resin having a hydroxyl value of 10 to 150, which is formed by graft-polymerizing (i) 2 to 40% by weight of an unsaturated polyester resin with 98 to 60% by weight of a monomer mixture comprising (iv) an N-alkoxymethylated monomer of an $\alpha,\beta$-monoethylenically unsaturated carboxylic acid amide and (ii) at least one $\alpha,\beta$-monoethylenically unsaturated monomer and (B) 85 to 5% by weight of a phosphoric acid group-containing copolymer resin derived from a monomer mixture comprising (iii) an $\alpha,\beta$-monoethylenically unsaturated monomer containing a phosphoric acid group and (ii) at least one $\alpha,\beta$-monoethylenically unsaturated monomer, (C) a surface active agent and/or a thickener in an amount of 0.01 to 1.0% by weight based on said resin particles and (D) a necessary amount of water.

DETAILED DESCRIPTION OF THE PREFERRED EMBODIMENTS

The present invention relates to an aqueous dispersion type thermosetting coating composition. More particularly, the present invention relates to an aqueous dispersion type thermosetting coating composition having excellent properties of resulting coating and being free of yellowing.

The polyester-modified vinyl resin (component [IA]) that is used in the present invention is formed by graft-polymerizing an unsaturated polyester resin as the component (i) with an $\alpha,\beta$-monoethylenically unsaturated monomer as the component (ii). This polyester-modified vinyl resin is characterized in that a vinyl resin is imparted with the merits of a polyester resin, such as good flexibility, good pigment dispersibility and good coating appearance, by the graft polymerization. An $\alpha,\beta$-unsaturated dicarboxylic acid is used as the starting compound that is used for formation of the above-mentioned unsaturated polyester resin. This unsaturated dicarboxylic acid is reacted in an amount of 1 to 10% by weight, preferably 3 to 7% by weight, in the unsaturated polyester resin.

If the amount of the unsaturated dicarboxylic acid component is smaller than 1% by weight, this amount is insufficient for the $\alpha,\beta$-monoethylenically unsaturated monomer at the step of forming the polyester-modified vinyl resin, modification with the polyester resin becomes insufficient and only a blend of the unsaturated polyester resin and a copolymer of the $\alpha,\beta$-monoethylenically unsaturated monomer is obtained. If such polymer blend is used, blushing of the resulting coating takes place and because of insufficient reactivity with the cross-linkable copolymer resin [IB], described hereinafter, properties of the resulting coating, especially adhesion, are likely to be degraded. Therefore, it is not preferred to use the unsaturated dicarboxylic acid component in such a small amount.

On the other hand, if the amount of unsaturated dicarboxylic acid component exceeds 10% by weight, gelation is caused during reaction with the $\alpha,\beta$-monoethylenically unsaturated monomer and good results cannot be obtained.

As the $\alpha,\beta$-unsaturated dicarboxylic acid component, there can be mentioned, for example, fumaric acid, maleic acid (maleic anhydride), itaconic acid, glutaconic acid and citraconic acid (citraconic anhydride). They may be used singly or in the form of a mixture of two or more of them.

In the synthesis of the unsaturated polyester resin that is used in the present invention, a carboxylic acid component other than the above-mentioned $\alpha,\beta$-unsaturated dicarboxylic acid component is reacted in an amount of 29 to 69% by weight. As such carboxylic acid component, there can be mentioned, for example, phthalic acid (phthalic anhydride), isophthalic acid, trimellitic acid (trimellitic anhydride), pyromellitic acid (pyromellitic anhydride), tetrahydrophthalic acid (tetrahydrophthalic anhydride), hexahydrophthalic acid (hexahydrophthalic anhydride), methylhexahydrophthalic acid (methylhexahydrophthalic anhydride), 3,6-endomethylene-tetrahydrophthalic anhydride, succinic acid (succinic anhydride), adipic acid, sebacic acid, benzoic acid and p-tert-butyl-benzoic acid. They may be used singly or in the form of a mixture of two or more of them.

In the synthesis of the unsaturated polyester resin that is used in the present invention, a polyhydric alcohol component is reacted preferably in an amount of 30 to 70% weight. As the polyhydric alcohol component, there can be mentioned, for example, ethylene glycol, diethylene glycol, propylene glycol, neopentyl glycol, dipropylene glycol, glycerin, trimethylolethane, trimethylolpropane, pentaerythritol, dipentaerythritol, butane diol, pentane diol, hexane diol, 1,4-cyclohexane dimethanol and bisphenol A (hydrogenated bisphenol A). These polyhydric alcohols may be used singly or in the form of a mixture of two or more of them. A glycidyl ester of a tertiary synthetic fatty acid (for example, a product manufactured and sold under trandename "Cardura E" by Shell Chemicals Co.) may be used in combination with the polyhydric alcohol component according to need.

In addition to the above-mentioned components, there may be used modifiers for the unsaturated polyester resin. For example, there may be used animal and vegetable oils, their fatty acids, petroleum resins, resins, phenolic resins and epoxy resins according to need.

The unsaturated polyester resin that is used in the present invention is prepared by a one-stage or multistage reaction according to known procedures, and the preparation process is not particularly critical. Furthermore, a polymerization solvent such as described hereinafter may be used as a diluent according to need.

In the unsaturated polyester resin that is used in the present invention, it is preferred that the acid valud be less than 50 (as determined with respect to the resin solid; the same will apply hereinafter), the hydroxyl value be 50 to 250 (as determined with respect to the resin solid; the same will apply hereinafter) and the weight average molecular weight be 2,000 and 20,000.

In the instant specification, the weight average molecular weight is one determined according to gel permeation chromatography using a chromatograph Model A801 manufactured by Tokyo Soda Co., Ltd.

In the present invention, if the acid value of the unsaturated polyester resin (i) is more than 50, there is a degradation in properties, especially alkali resistance, of the resulting coating formed from the coating composition comprising the polyester-modified vinyl resin [IA] formed by graft-polymerizing the unsaturated polyester with the $\alpha,\beta$-monoethylenically unsaturated monomer. If the hydroxyl value is less than 50, the polyester-modified vinyl resin [IA] formed by graft-polymerizing the unsaturated polyester with the $\alpha,\beta$-monoethylenically unsaturated monomer is insufficient in cross-linkability with the cross-linkable copolymer resin [IB] described hereinafter. If the hydroxyl value is more than 250, the water resistance of the resulting coating tends to decrease owing to an increase of polar groups. If the weight average molecular weight is lower than 2,000, it will not be possible for the polyester resin to exhibit its characteristics sufficiently, and if the weight average molecular weight exceeds 20,000, on modification with the $\alpha,\beta$-monoethylenically unsaturated monomer, the viscosity is increased greatly because the molecular weight of the polyester resin is too high, and the coating workability becomes difficult.

The "polyester-modified vinyl resin" referred to in the present invention is one prepared by graft-polymerizing the above-mentioned unsaturated polyester resin (i) with the $\alpha,\beta$-monoethylenically unsaturated monomer (ii). As the monomer (ii), there is used at least one member selected from $\alpha,\beta$-monoethylenically unsaturated carboxylic acids such as described hereinafter, hydroxyalkyl esters of these $\alpha,\beta$-monoethylenically unsaturated acids and alkyl esters of acrylic and methacrylic acids.

The polyester-modified vinyl resin [IA] should contain in the molecule a hydroxyl group for the cross-linking reaction with the cross-linkable copolymer resin [IB] described hereinafter. Accordingly, when the hydroxyl value of the above-mentioned unsaturated polyester resin is relatively small, it is preferred that a hydroxyalkyl ester of an $\alpha,\beta$-monoethylenically unsaturated carboxylic acid be used as one $\alpha,\beta$-monoethylenically unsaturated monomer. This hydroxyalkyl ester monomer is used in an amount of 5 to 50% by weight, preferably 8 to 30% by weight, in the α,β-monoethylenically unsaturated monomers so that the hydroxyl value of the polyester-modified vinyl resin [IA] is 30 to 200. If the hydroxyalkyl ester monomer is used in an amount of more than 50% by weight, the viscosity of the resulting polyester-modified vinyl resin [IA] becomes too high as does the cross-linkability of the resin [IA] with the cross-linkable copolymer resin [IB], with the result that the flexibility and water resistance of the resulting coating are reduced.

As the hydroxyalkyl ester monomer, there can be mentioned, for example, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-hydroxybutyl acrylate, 2-hydroxybutyl methacrylate, 3-hydroxybutyl acrylate, 3-hydroxybutyl methacrylate, 4-hydroxybutyl acrylate, 4-hydroxybutyl methacrylate, 5-hydroxypentyl acrylate, 5-hydroxypentyl methacrylate, 6-hydroxyhexyl acrylate, 6-hydroxyhexyl methacrylate, neopentyl glycol monoacrylate, neopentyl glycol monomethacrylate, 3-butoxy-2-hydroxypropyl acrylate, 3-butoxy-2-hydroxypropyl methacrylate, 2-hydroxy-1-phenylethyl acrylate, 2-hydroxy-1-phenylethyl methacrylate, polypropylene glycol monoacrylate, propylene glycol monomethacrylate, glycerin monoacrylate and glycerin monomethacrylate. These monomers may be used singly or in the form of a mixture of two or more of them.

The monomer other than the above-mentioned hydroxyalkyl ester of the α,β-monoethylenically unsaturated carboxylic acid, that is used for graft polymerization to the unsaturated polyester resin, may be used in an amount of 50 to 95% in the monomer mixture.

As such monomer, there can be mentioned, for example, α,β-monoethylenically unsaturated carboxylic acids such as acrylic acid, methacrylic acid, itaconic acid, maleic acid and fumaric acid; alkyl esters of acrylic acid and methacrylic acid such as methyl acrylate, methyl methacrylate, ethyl acrylate, ethyl methacrylate, n-propyl acrylate, p-propyl methacrylate, isopropyl acrylate, isopropyl methacrylate, n-butyl acrylate, n-butyl methacrylate, sec-butyl acrylate, sec-butyl methacrylate, t-butyl acrylate, t-butyl methacrylate, isobutyl acrylate, isobutyl methacrylate, n-hexyl acrylate, n-hexyl methacrylate, 2-ethylhexyl acrylate, 2-ethylhexyl methacrylate, n-octyl acrylate, n-octyl methacrylate, lauryl acrylate, lauryl methacrylate, tridecyl acrylate, tridecyl methacrylate, stearyl acrylate and stearyl methacrylate; N,N'-dimethylaminoethyl acrylate, N,N'-dimethylaminoethyl methacrylate, glycidyl acrylate, glycidyl methacrylate, cyclohexyl acrylate, cyclohexyl methacrylate, phenyl methacrylate, benzyl methacrylate, dialkyl esters of fumaric acid such as dimethyl fumarate, styrene, vinyl toluene, α-methyl styrene, acrylonitrile, methacrylonitrile and vinyl acetate. These monomers are appropriately chosen according to the intended object and use of the final coating composition, and they may be used singly or in the form of a mixture of two or more of them.

In the first embodiment [I] of the present invention, the polyester-modified vinyl resin [IA] is composed of a graft polymerization product of 5 to 50% by weight of the above-mentioned unsaturated polyester resin (i) and 50 to 95% by weight of at least one α,β-monoethylenically unsaturated monomer (ii) such as mentioned above. As pointed out hereinbefore, the modification quantity of the unsaturated polyester resin is 5 to 50% by weight and preferably 10 to 40% by weight. If the modification quantity is less than 5% by weight, excellent properties of the polyester resin, such as good flexibility, good pigment dispersibility and good coating appearance are not sufficiently exhibited, and if the modification quantity is more than 50% by weight, good characteristics of the vinyl resin, such as high hardness and good stain resistance, are degraded. Accordingly, in each case, good results cannot be obtained.

In the second embodiment [II] of the present invention, a phosphoric acid group-containing α,β-monoethylenically unsaturated monomer as the component (iii) is introduced into the polyester-modified vinyl resin [IIA].

As the monomer (iii), there can be mentioned, for example, hydroxyl group-containing primary phosphoric acid esters of acrylic acid and methacrylic acid such as acid phosphoxyethyl acrylate, acid phosphoxyethyl methacrylate, acid phosphoxypropyl acrylate, acid phosphoxypropyl methacrylate and 3-chloro-2-acid-phosphoxypropyl methacrylate, and bisacryloxyethyl phosphate, bismethacryloxyethyl phosphate, acryl alcohol acid phosphate, vinyl phosphate, mono[2-hydroxyethyl acrylate] acid phosphite, mono[2-hydroxyethyl methacrylate] acid phosphite and salts and esters thereof. These monomers may be used singly or in the form of a mixture of two or more of them. These monomers may be prepared by reacting a hydroxyl group-containing α,β-monoethylenically unsaturated monomer with phosphoric anhydride and hydrolyzing the resulting reaction product. Furthermore, they may be prepared by using orthophosphoric acid, meta-phosphoric acid, phosphorus oxychloride, phosphorus trichloride or phosphorus pentachloride.

In the embodiment [II] using the phosphoric acid group-containing α,β-monoethylenically unsaturated monomer (iii), as pointed out hereinbefore, the component (i) is used in an amount of 2 to 50% by weight and the component (ii) is used in an amount of 95 to 40% by weight, and the component (iii) is used in an amount of 0.01 to 10.0% weight, preferably 0.5 to 6.0% by weight.

If the amount of the component (iii) is less than 0.01% by weight, attainment of the intended effects of the present invention, that is, the flash rusting-preventing effect, the effect of improving the storage stability and the effect of enhancing the corrosion resistance, cannot be expected, and if the amount of the component (iii) exceeds 10% by weight, gelation is readily caused during the graft polymerization process, and since satisfactory results are obtained with use of up to 10% by weight of the component (iii), also from the economical viewpoint, it is not preferred to use the component (iii) in an amount exceeding 10% by weight.

As pointed out hereinbefore, the modification quantity of the unsaturated polyester resin is 2 to 50% by weight and preferably 10 to 40% by weight. If the modification quantity of the unsaturated polyester resin is less than 2% by weight, excellent properties of the polyester resin such as high flexibility, good pigment dispersibility and good coating appearance cannot be sufficiently exhibited, and if the modification quantity of the unsaturated polyester resin exceeds 50% by weight, characteristics of the vinyl resin such as high hardness and good stain resistance are degraded.

The polyester-modified vinyl resin [IIA] should contain in the molecule a hydroxyl group for cross-linking reaction with the cross-linkable copolymer resin [IIB] described hereinafter. Accordingly, when the hydroxyl value of the unsaturated polyester resin is relatively small, it is preferred that a hydroxyalkyl ester of an $\alpha,\beta$-monoethylenically unsaturated carboxylic acid be used as one $\alpha,\beta$-monoethylenically unsaturated monomer. The hydroxyalkyl ester monomer is used in an amount of 1 to 40% by weight, preferably 5 to 20% by weight, in the $\alpha,\beta$-monoethylenically unsaturated monomers so that the hydroxyl value of the polyester-modified vinyl resin is 30 to 200. When this monomer is used in an amount exceeding 40% by weight, the viscosity of the resulting polyester-modified vinyl resin [IIA] becomes too high as does the density of cross-linking with the cross-linking copolymer resin [IIB] described hereinafter, resulting in reduction of flexibility and water resistance of the resulting coating.

Monomers mentioned hereinbefore with respect to the synthesis of the polyester-modified vinyl resin may also be used as the hydroxyalkyl ester in the second embodiment for the synthesis of the polyester-modified vinyl resin [IIA].

The monomer other than the phosphoric acid group-containing $\alpha,\beta$-monoethylenically unsaturated monomer and the hydroxyalkyl ester of the $\alpha,\beta$-monoethylenically unsaturated carboxylic acid, that is used for graft polymerization to the unsaturated polyester resin, may be used in an amount of 60 to 99% by weight, preferably 80 to 95% by weight, in the monomer mixture.

Monomers mentioned above with respect to the synthesis of the polyester-modified vinyl resin [IA] may also be used as such monomer for the synthesis of the polyester-modified vinyl resin [IIA].

By introducing the above-mentioned phosphoric acid group-containing $\alpha,\beta$-monoethylenically unsaturated monomer into the polyester-modified vinyl resin [IIA], even if the resulting coating composition is directly coated on an iron plate, occurrence of flash rusting is inhibited, and the storage stability of the coating composition is remarkably improved. Furthermore, the adhesion of the coating to the metal surface is further enhanced and very excellent corrosion resistance and water resistance can be obtained.

The polyester-modified vinyl resin [IA] or [IIA] may be prepared according to the customary solution polymerization process. For example, there may be adopted a method in which a mixture of the unsaturated polyester resin and some monomer (or a part of the monomer mixture) in a polymerization solvent is prepared and the remaining monomer (or the remaining monomer mixture) and a polymerization initiator are added dropwise to the mixture to effect polymerization, and a method in which the unsaturated polyester resin, monomers (or the monomer mixture) and a polymerization initiator are added dropwise to a polymerization solvent to effect polymerization. However, the solution polymerization method is not particularly critical in the present invention.

The polymerization temperature is ordinarily between about 50° C. and about 150° C., and the polymerization time is usually within a range of about 4 to about 12 hours, though the polymerization time is changed to some extent depending on the polymerization temperature.

A water-soluble or water-miscible solvent is used as the polymerization solvent in the above-mentioned solution polymerization process. For example, there may be employed alcohols such as methyl alcohol, ethyl alcohol, isopropyl alcohol and n-propyl alcohol; ethylene glycol derivatives such as ethylene glycol monomethyl ether, ethylene glycol monoethyl ether, ethylene glycol monobutyl ether and ethylene glycol monoethyl ether acetate; diethylene glycol derivatives such as diethylene glycol monomethyl ether, diethylene glycol monoethyl ether and diethylene glycol monobutyl ether; esters such as methyl acetate, ethyl acetate and butyl acetate; and ketones such as methylethyl ketone and methylisobutyl ketone. These polymerization solvents may be used singly or in the form of a mixture of two or more of them. A polymerization solvent having a water solubility of about 10 to about 30% by weight as determined at 20° C. is especially preferred.

For the synthesis of the polyester-modified vinyl resin [IA], the polymerization solvent is preferably used in such an amount that the non-volatile component content of the resin is 10 to 80% by weight, particularly 35 to 75% by weight, and for the synthesis of the polyester-modified vinyl resin [IIA], the polymerization solvent is preferably used in such an amount that the non-volatile component content of the resin is 10 to 80% by weight, particularly 20 to 70% by weight. In the second embodiment [II], it is preferred that the non-volatile component content be reduced with an increase in the amount used of the phosphoric acid group-containing $\alpha,\beta$-monoethylenically unsaturated monomer.

As the polymerization initiator that is used for the solution polymerization, there can be mentioned, for example, organic peroxides such as benzoyl peroxide, t-butyl perbenzoate, t-butyl hydroperoxide, cumene hydroperoxide, di-t-butyl peroxide and t-butyl peroctoate, and azo compounds such as azobisisobutyronitrile and azodiisobutyronitrile. These polymerization initiators may be used singly or in the form of a mixture of two or more of them. The polymerization initiator is used in an amount of about 0.1 to about 15% by weight based on the non-volatile components for the synthesis of the polyester-modified vinyl resin.

Furthermore, a chain transfer agent for adjusting the molecular weight, such as dodecylmercaptan, 2-ethylhexyl thioglycolate or carbon tetrachloride, may be used according to need. The chain transfer agent is used in an amount up to about 5% by weight based on the non-volatile components for the synthesis of the polyester-modified vinyl resin.

The polyester-modified vinyl resin [IA] or [IIA] that is used in the present invention has a hydroxyl value of 30 to 200, preferably 50 to 150, and an acid value of 5 to 30, preferably 7 to 27. If the acid value is less than 5, since the thermosettability is insufficient, the resulting coating is poor in hardness, water resistance, corrosion resistance and durability. On the other hand, if the acid value exceeds 30, the properties of the coating and the storage stability of the coating composition are degraded. If the hydroxyl value is less than 30, the cross-linking density is lowered, and the solvent resistance of the resulting coating is degraded. On the other hand, if the hydroxyl value exceeds 200, both the flexibility and water resistance of the resulting coating are degraded.

It is preferred that the weight average molecular weight of the polyester-modified vinyl resin [IA] that is used in the present invention be 10,000 to 80,000, especially 20,000 to 60,000. When the weight average molecular weight is lower than 10,000, the properties of the resulting coating are insufficient, and if the weight average molecular weight exceeds 80,000, the smoothness is lost in the resulting coating and good results cannot be obtained.

It is preferred that the weight average molecular weight of the polyester-modified vinyl resin [IIA] be 20,000 100,000, especially 30,000 to 80,000. If the weight average molecular weight is lower than 20,000, the properties of the coating are insufficient, and if the weight average molecular weight exceeds 100,000, the smoothness is lost in the resulting coating and good results are not obtained.

Since the polyester-modified vinyl resin [IIA] that is used in the present invention is high in reactivity, the viscosity tends to increase when the temperature is high, for example, in summer. In this case, for further improving the storage stability, the acid group introduced in the polyester-modified vinyl resin is neutralized by a basic compound, whereby the polyester-modified vinyl resin is rendered more stable. As the basic compound, there can be mentioned, for example, alkali metal hydroxides such as sodium hydroxide and potassium hydroxide, water-soluble amines such as ammonia, monomethylamine, dimethylamine, trimethylamine, triethylamine, monoethylamine, mono-n-propylamine and dimethyl-n-propylamine, and water-soluble hydroxylamines such as monoethanol amine, diethanol amine, triethanol amine, N-methylethanol amine, N-aminoethylethanol amine, N-methyldiethanol amine, monoisopropanol amine, diisopropanol amine, tripropanol amine and hydroxylamine. These basic compounds may be used singly or in the form of a mixture of two or more of them. In the present invention, this neutralization with the basic compound includes neutralization of a part of the acid group contained in the polyester-modified vinyl resin [IIA] and neutralization of all of the acid group contained in the polyester-modified vinyl resin [IIA]. Furthermore, in view of the stability of the polyester-modified vinyl resin [IIA] or properties of the resulting coating, the basic compound may be added in an excess amount.

In the present invention, an N-alkoxymethylated monomer of an $\alpha,\beta$-monoethylenically unsaturated carboxylic acid amide is used as the indispensable component (iv). This component (iv) is indispensable for cross-linking of the cross-linkable copolymer resin [IB] or [IIB] with the above-mentioned polyester-modified vinyl resin [IA] or [IIA]. The component (iv) is reacted in an amount of 5 to 30% by weight, preferably 10 to 25% by weight, in the cross-linkable copolymer resin [IB] or [IIB]. If the amount of the component (iv) is less than 5% by weight, the cross-linking reaction with the polyester-modified vinyl resin is insufficient and the solvent resistance of the resulting coating is degraded, and if the amount of the component (iv) is more than 30% by weight, gelation is caused during preparation of the cross-linkable copolymer resin and good results cannot be obtained.

As the component (iv), there can be mentioned, for example, N-alkoxymethylated products of $\alpha,\beta$-monoethylenically unsaturated carboxylic acid amides such as N-methoxymethyl acrylamide, N-methoxymethyl methacrylamide, N-ethoxymethyl acrylamide, N-ethoxymethyl methacrylamide, N-n-propoxymethyl acrylamide, N-n-propoxymethyl methacrylamide, N-isopropoxymethyl acrylamide, N-isopropoxymethyl methacrylamide, N-n-butoxymethyl acrylamide, N-n-butoxymethyl methacrylamide, N-sec-butoxymethyl acrylamide, N-sec-butoxymethyl methacrylamide, N-t-butoxymethyl acrylamide, N-t-butoxymethyl methacrylamide, N-isobutoxymethyl acrylamide and N-isobutoxymethyl methacrylamide, and N-methylolated products thereof. These compounds may be used singly or in the form of a mixture of two or more.

In the present invention, an $\alpha,\beta$-monoethylenically unsaturated carboxylic acid may be used in an amount of 0.5 to 10% by weight as one component of the cross-linkable copolymer resin [IB] or [IIB]. This monomer has effects of improving the compatibility of the cross-linkable copolymer resin with the polyester-modified vinyl resin and promoting the cross-linking reaction between them. If the amount of this monomer is less than 0.5% by weight, these effects are low, and if the amount of this monomer is more than 10% by weight, properties of the cured coatings are degraded and good results cannot be obtained.

As specific examples of the above-mentioned monomer, there can be mentioned acrylic acid, methacrylic acid, crotonic acid, itaconic acid, maleic acid and fumaric acid. These compounds may be used singly or in the form a mixture of two or more of them.

For the synthesis of the cross-linkable copolymer resin [IB] or [IIB], a copolymerizable $\alpha,\beta$-ethylenically unsaturated monomer other than mentioned above is preferably reacted in an amount of 60 to 90% by weight. As such copolymerizable monomer, there can be mentioned, for example, alkyl esters of acrylic acid and methacrylic acid such as methyl acrylate, methyl methacrylate, ethyl acrylate, ethyl methacrylate, n-propyl acrylate, n-propyl methacrylate, isopropyl acrylate, isopropyl methacrylate, n-butyl acrylate, n-butyl methacrylate, sec-butyl acrylate, sec-butyl methacrylate, t-butyl acrylate, t-butyl methacrylate, isobutyl acrylate, isobutyl methacrylate, n-hexyl acrylate, n-hexyl methacrylate, 2-ethylhexyl acrylate, 2-ethylhexyl methacrylate, n-octyl acrylate, n-octyl methacrylate, lauryl acrylate, lauryl methacrylate, tridecyl acrylate, tridecyl methacrylate, stearyl acrylate and stearyl methacrylate; hydroxyalkyl esters of $\alpha,\beta$-ethylenically unsaturated carboxylic acids such as 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-hydroxybutyl acrylate, 2-hydroxybutyl methacrylate, 3-hydroxybutyl acrylate, 3-hydroxybutyl methacrylate, 4-hydroxybutyl acrylate, 4-hydroxybutyl methacrylate, 5-hydroxypentyl acrylate, 5-hydroxypentyl methacrylate, 6-hydroxyhexyl acrylate, 6-hydroxyhexyl methacrylate, neopentyl glycol monoacrylate, neopentyl glycol monomethacrylate, 3-butoxy-2-hydroxypropyl acrylate, 5-butoxy-2-hydroxypropyl methacrylate, 2-hydroxy-1-phenylethyl acrylate, 2-hydroxy-1-phenylethyl methacrylate, polypropylene glycol monoacrylate, propylene glycol monomethacrylate, glycerin monoacrylate and glycerin monomethacrylate; and other monomers such as N'-dimethylaminoethyl acrylate, N'-dimethylaminoethyl methacrylate, glycidyl acrylate, glycidyl methacrylate, cyclohexyl acrylate, cyclohexyl methacrylate, phenyl methacrylate, benzyl methacrylate, alkyl esters of fumaric acid, e.g., dibutyl fumarate, styrene, vinyl toluene, $\alpha$-methylstyrene, acrylonitrile, methacrylonitrile and vinyl acetate. These monomers may be chosen appropriately according to the intended object and use of the resulting coating composition and used singly or in the form of a mixture of two or more of them.

The cross-linkable copolymer resin [IB] or [IIB] may be prepared by the solution polymerization according to customary procedures. A water-soluble or water-miscible solvent such as mentioned above may be used for the solution polymerization, and an organic peroxide or azo compound such as mentioned above may be used as the polymerization initiator. Furthermore, a chain transfer agent such as mentioned above may be used for adjusting the molecular weight. The polymerization for the synthesis of the cross-linkable copolymer resin is carried out at a temperature of about 50° to about 150° C. for about 4 to about 12 hours. The amount of the polymerization solvent is adjusted so that the concentration of the non-volatile components for the synthesis of the copolymer resin is 10 to 80% by weight, preferably 35 to 75% by weight. The amount of the polymerization initiator used is about 0.1 to about 15% by weight based on the non-volatile components for the synthesis of the cross-linkable copolymer resin, and the chain transfer agent is used in an amount of up to about 5% by weight based on the non-volatile components for the synthesis of the cross-linkable copolymer resin.

In the first embodiment [I], it is preferred that the weight average molecular weight of the cross-linkable copolymer resin be 10,000 to 70,000, especially 20,000 to 60,000. If the weight average molecular weight is lower than 10,000, the properties of the resulting coating are insufficient, and if the weight average molecular weight is higher than 70,000 the smoothness of the resulting coating is degraded.

In the second embodiment [II], it is preferred that the weight average molecular weight of the cross-linkable copolymer resin be 10,000 to 100,000, especially 20,000 to 80,000.

In the present invention, (A) the above-mentioned polyester-modified vinyl resin [IA] or [IIA] is mixed with (B) the above-mentioned cross-linkable copolymer resin [IB] or [IIB]. The mixing weight ratio of the polyester-modified vinyl resin to the cross-linkable copolymer resin is in the range of from 5/95 to 90/10, preferably from 10/90 to 70/30. If the amount of the cross-linkable copolymer resin is less than 10% by weight, the cross-linking density is low in the resulting coating and the solvent resistance and chemical resistance of the coating tend to decrease. On the other hand, if the amount of the cross-linkable copolymer resin is more than 95% by weight, the amount of the polyester-modified vinyl resin is reduced and excellent characteristics inherent of the polyester resin, such as excellent flexibility, good pigment dispersibility and good coating appearance, cannot be manifested, with the result that the intended objects of the present invention cannot be attained.

In the present invention, it is preferred that particles composed of the polyester-modified vinyl resin [IA] or [IIA] and the cross-linkable copolymer resin [IB] or [IIB] should have a softening point of 30° to 100° C., especially 40° to 80° C. If the softening point is lower than 30° C., the storage stability of the coating composition becomes poor, and if the softening point is higher than 100° C., properties of the coating, for example, the surface smoothness, are degraded.

In the present invention, a known acid catalyst may be used for promoting the cross-linking reaction between the polyester-modified vinyl resin and the cross-linkable copolymer resin. Furthermore, a film-forming resin such as an epoxy resin, a cellulose type resin or an amino resin may be used in combination with the foregoing resin components.

The third embodiment [III] of the present invention will now be described. In this embodiment, a monomer mixture containing (iv) an N-alkoxy-methylated monomer of an $\alpha,\beta$-monoethylenically unsaturated carboxylic acid amide is used for the synthesis of the polyester-modified vinyl resin, and a phosphoric acid group-containing copolymer resin derived from a monomer mixture containing (iii) an $\alpha,\beta$-monoethylenically unsaturated monomer containing a phosphoric acid group is used as the cross-linkable copolymer resin (B).

In this third embodiment [III] of the present invention, the polyester-modified vinyl resin to be used is prepared by graft-copolymerizing an unsaturated polyester resin such as mentioned above with a monomer mixture containing at least (iv) an N-alkoxymethylated monomer of an $\alpha,\beta$-monoethylenically unsaturated carboxylic acid amide and another ordinary $\alpha,\beta$-monoethylenically unsaturated carboxylic acid amide and another ordinary $\alpha,\beta$-monoethylenically unsaturated monomer, for example, an $\alpha,\beta$-monoethylenically unsaturated carboxylic acid described hereinbefore, a hydroxyalkyl ester thereof, or an alkyl ester of acrylic acid or methacrylic acid.

In this embodiment [III], the polyester-modified vinyl resin [IIIA] should contain in the molecule a hydroxyl group for not only cross-linking with the phosphoric acid group-containing copolymer resin [IIB] but also for a self-cross-linking reaction.

Accordingly, when the hydroxyl value of the unsaturated polyester resin is relatively small, it is preferred that a hydroxyalkyl ester of an $\alpha,\beta$-monoethylenically unsaturated carboxylic acid be used as one $\alpha,\beta$-monoethylenically unsaturated monomer.

The hydroxylalkyl ester monomer is used in an amount of 1 to 30% by weight, preferably 3 to 20% by weight, in the starting monomer mixture so that the hydroxyl value of the polyester-modified vinyl resin is 10 to 150.

When the hydroxyalkyl ester monomer is used in an amount exceeding 30% by weight, the polyester-modified vinyl resin [IIIA] is highly viscous and the cross-linking degree of the product formed by the thermosetting reaction with the phosphoric acid group-containing copolymer resin [IIIB] becomes too high. Therefore, such properties of the resulting coating as flexibility and water resistant tend to decrease and good results are not obtained.

The hydroxyalkyl ester monomers mentioned above with respect to the synthesis of the polyester-modified vinyl resins [IA] and [IIA] are similarly used also in this embodiment [III].

The N-alkoxymethylated monomer of the polymerizable $\alpha,\beta$-monoethylenically unsaturated carboxylic acid amide that is used for the graft polymerization with the unsaturated polyester resin is indispensible for the cross-linking reaction with the hydroxyalkyl ester of the $\alpha,\beta$-monoethylenically unsaturated carboxylic acid and the polyester resin component. As this monomer component, those mentioned above for the synthesis of the polyester-modified vinyl resin [IA] or [IIA] may be used. This monomer component is graft-polymerized in an amount of 5 to 30% by weight, preferably 10 to 20% by weight, in the $\alpha,\beta$-monoethylenically unsaturated monomer mixture. If the amount of this monomer component is less than 5% by weight, the cross-linking reactivity of the polyester-modified vinyl resin [IIIA] is insufficient and the solvent resistance of the resulting coating is reduced. When the amount of this monomer component exceeds 30% by weight, gelatin is caused during the graft polymerization and good results are not obtained.

In the third embodiment [III] of the present invention, an α, β-monoethylenically unsaturated monomer other than the hydroxyalkyl ester of the α,β-monoethylenically unsaturated carboxylic acid and the N-alkoxymethylated monomer of the α,β-monoethylenically unsaturated carboxylic acid amide may be used in combination with these monomers. As such α,β-monoethylenically unsaturated monomer, there may be used those mentioned above for the synthesis of the polyester-modified vinyl resin [IA], and such α, β-monoethylenically unsaturated monomer is preferably used in an amount of 60 to 90% by weight in the starting monomer mixture.

In the embodiment [III], the polyester-modified vinyl resin [IIIA] is formed by graft-polymerizing 2 to 40% by weight of the above-mentioned unsaturated polyester resin with 60 to 98% by weight of the above-mentioned monomer mixture. The modification quantity of the unsaturated polyester resin is 2 to 40% by weight, preferably 5 to 30% by weight. If the modification quantity is smaller than 2% by weight, the excellent properties of the polyester resin, such as good flexibility, good pigment dispersibility and excellent coating appearance are not sufficiently exhibited, and if the modification quantity of the polyester resin exceeds 40% by weight, good characteristics of the vinyl resin such as high hardness and good stain resistance are degraded.

The polyester-modified vinyl resin [IIIA] is prepared by the solution polymerization in the same manner as described hereinbefore with respect to the polyester-modified vinyl resin [IA].

The hydroxyl value of this polyester-modified vinyl resin [IIIA] is 10 to 150, preferably 20 to 100, and the acid value thereof is 3 to 40, preferably 5 to 25. If the acid value is less than 3, the thermosetting property becomes insufficient and the resulting coating is poor in hardness, water resistance, corrosion resistance and durability. On the other hand, if the acid value exceeds 40, the properties of the coating and the storage stability of the coating composition are degraded. If the hydroxyl value is smaller than 10, the cross-linking density is reduced and the solvent resistance of the resulting coating is degraded. On the other hand, if the hydroxyl value is larger than 150, both the flexibility and the water resistance of the resulting coating are poor.

In the third embodiment [III] of the present invention, is is preferred that the weight average molecular weight of the polyester-modified vinyl resin [IIIA] be 40,000 to 200,000, especially 50,000 to 150,000. If the weight average molecular weight is lower than 40,000, the properties of the coating are insufficient, and if the weight average molecular weight exceeds 200,000, the smoothness of the coating is degraded and good results are not obtained.

The phosphoric acid group-containing copolymer resin [IIIB] that is used in the embodiment [III] is formed by copolymerizing the phosphoric acid group-containing α,β-monoethylenically unsaturated monomer as the indispensable component with other α,β-monoethylenically unsaturated monomer. By introducing the phosphoric acid group-containing α,β-monoethylenically unsaturated monomer into the copolymer resin [IIIB], even when the resulting coating composition is directly coated on an iron plate, flash rusting is controlled and the adhesion to the metal surface is highly improved. Moreover, the storage stability of the coating composition is improved, and there can be obtained a coating excellent in such properties as corrosion resistance and water resistance.

The above-mentioned phosphoric acid group-containing α,β-monoethylenically unsaturated monomer is used in an amount of 0.01 to 10.0% by weight, preferably 0.5 to 5.0% by weight, in the monomer mixture. When the amount of this monomer is less than 0.1% by weight, the intended effects of the present invention, that is, the effects of preventing flash rusting, improving storage stability and enhancing corrosion resistance, cannot be attained. If the amount of this monomer exceeds 10% by weight, gelation is caused during the polymerization process and good results can not be obtained. Furthermore, since satisfactory results are obtained even if this monomer is used in an amount of up to 10% by weight, from the economical viewpoint, it is not preferred to use this monomer in an amount exceeding 10% by weight.

As the phosphoric acid group-containing α,β-monoethylenically monomer, there can be used those mentioned hereinbefore with respect to the synthesis of the polyester-modified vinyl resin [IIA].

As the α,β-monoethylenically unsaturated monomer other than the phosphoric acid group-containing α,β-monoethylenically unsaturated monomer as the indispensable component, that is used in combination with this indispensable monomer for the synthesis of the phosphoric acid group-containing copolymer resin [IIIB], there can be used ordinary α,β-monoethylenically unsaturated monomers, for example, α,β-monoethylenically unsaturated carboxylic acids such as mentioned above, hydroxyalkyl esters thereof and alkyl esters of acrylic acid and methacrylic acid. These monomers may be used singly or in the form of a mixture of two or more of them.

The phosphoric acid group-containing copolymer resin [IIIB] should contain in the molecule a hydroxyl group for cross-linking with the polyester-modified vinyl resin [IIIA]. Accordingly, in order to attain a good balance between the components [IIIA] and [IIIB] with respect to the contained hydroxyl groups, it is preferred that an appropriate amount of a hydroxyalkyl ester of an α,β-monoethylenically unsaturated carboxylic acid be used as one α,β-monomethylenically unsaturated monomer for the synthesis of the phosphoric acid group-containing copolymer resin [IIIB].

The hydroxyalkyl ester monomer is used in an amount of 1 to 30% by weight, preferably 2 to 15% by weight, in the starting monomer mixture to be used for the synthesis of the phosphoric acid group-containing copolymer resin [IIIB]. If this monomer is used in an amount exceeding 30% by weight, gelation is readily caused during the copolymerization reaction, and the resulting phosphoric acid group-containing copolymer resin [IIIB] becomes highly viscous and the density of crosslinking with the polyester-modified vinyl resin [IIIA] becomes too high, resulting in reduction of flexibility and water resistance of the resulting coating. Accordingly, it is not preferred to use the hydroxyalkyl ester monomer in such a large amount. As the hydroxyalkyl ester monomer, use can be made of those described hereinbefore.

In the third embodiment [III] of the present invention it is preferred that an α,β-monoethylenically unsaturated carboxylic acid be used in an amount of 0.5 to 10% by weight as one component of the phosphoric acid group-containing copolymer resin [IIIB]. This monomer improves the compatibility of the phosphoric acid group-containing copolymer resin [IIIB] with the polyester-modified vinyl resin [IIIA] and the cross-linking reaction between them is promoted. When the amount of this monomer is less than 0.5% by weight, these effects are not prominent, and if the amount of this monomer exceeds 10% by weight, the properties of the resulting cured coating are degraded and good results are not obtained.

As such monomer, there can be mentioned, for example, acrylic acid, methacrylic acid, crotonic acid, itaconic acid maleic acid and fumaric acid. These compounds may be used singly or in the form of a mixture of two or more of them.

In the third embodiment [III] of the present invention, it is preferred that a copolymerizable $\alpha,\beta$-monoethylenically unsaturated monomer, other than the monomers mentioned above, be used in an amount of 70 to 90% by weight as one starting monomer for the synthesis of the phosphoric acid group-containing copolymer resin [IIIB]. As such monomer, there can be used copolymerizable $\alpha,\beta$-monoethylenically unsaturated monomers mentioned hereinbefore with respect to the synthesis of the cross-linkable copolymer resin [IB] or [IIB].

The phosphoric acid group-containing copolymer resin [IIIB] used in the embodiment [III] of the present invention is prepared by the solution polymerization according to customary procedures. A water-soluble or water-miscible solvent such as mentioned above is used as the solvent for the solution polymerization. An organic peroxide or azo compound such as mentioned above is used as the polymerization initiator. Furthermore, a chain transfer agent such as mentioned above may be used so as to adjust the molecular weight. The polymerization reaction for the synthesis of the phosphoric acid group-containing copolymer resin [IIIB] is ordinarily carried out at a temperature of about 50° to about 150° C. for about 4 to about 12 hours. It is preferred that the solvent be used in such an amount that the non-volatile component content in the reaction mixture for the synthesis of the copolymer resin [IIIB] is 10 to 80% by weight, especially 20 to 70% by weight. It is especially preferred that the non-volatile component content be reduced with an increase in the amount used of the phosphoric acid group-containing $\alpha,\beta$-monoethylenically monomer. Furthermore, it is preferred that the polymerization initiator and chain transfer agent be used in amounts of about 0.1 to about 15% by weight and up to about 5% by weight, respectively, based on the non-volatile components for the synthesis of the copolymer resin [IIIB].

In the third embodiment [III] of the present invention, it is preferred that the weight average molecular molecular weight of the phosphoric acid group-containing copolymer resin [IIIB] be 8,000 to 70,000, especially 20,000 to 50,000. If the weight average molecular weight is lower than 8,000, the properties of the resulting coating are insufficient, and if the weight average molecular weight exceeds 70,000, the smoothness of the resulting coating is degraded.

It is preferred that the hydroxyl value of the phosphoric acid group-containing copolymer resin [IIIB] be in the range of 3 to 150.

Since the phosphoric acid group-containing copolymer resin [IIIB] is high in reactivity, the viscosity is readily increased when the temperature is high, for example, in summer. In this case, in order to further improve the storage stability, a basic compound is incorporated for neutralizing the acid groups introduced into the phosphoric acid group-containing copolymer resin, whereby the phosphoric acid group-containing copolymer resin [IIIB] is rendered more stable.

As such basic compound, there can be used those mentioned above with respect to neutralization of the acid groups contained in the polyester-modified vinyl resin [IIA].

Neutralization with such basic compound includes not only neutralization of a part of the phosphoric acid group contained in the copolymer resin [IIIB] but also neutralization of all of the phosphoric acid group contained in the copolymer resin [IIIB]. Furthermore, in view of the stability of the resulting coating composition or the properties of the coating, the basic compound may be added to an excess amount.

In the third embodiment [III] of the present invention, the polyester-modified vinyl resin [IIIA] and the phosphoric acid group-containing copolymer resin [IIIB] is used at a [IIIA]/[IIIB] weight ratio of from 15/85 to 95/5, preferably from 30/70 to 90/10.

If the amount of the polyester-modified vinyl resin [IIIA] is less than 15% by weight, the excellent properties of the polyester resin, such as good flexibility, good pigment dispersibility and good coating appearance, are not sufficiently exhibited. On the other hand, if the amount of the polyester-modified vinyl resin [IIIA] exceeds 95% by weight, the amount of the phosphoric acid group-containing copolymer resin [IIIB] is inevitably reduced, and the intended effect of the present invention, that is, the effect of preventing flash rusting, is hardly attained in addition, the corrosion resistance and water resistance are degraded.

It is preferred that the softening point of the resin particles composed of the polyester-modified vinyl resin [IIIA] and the phosphoric acid group-containing copolymer resin [IIIB], that are used in the third embodiment [III] of the present invention, be 30° to 100° C., especially 40° to 80° C. If the softening point of the resin particles is lower than 30° C., the storage stability of the coating composition tends to decrease, and if the softening point is higher than 100° C., the smoothness of the coating is degraded and good results cannot be obtained.

In the third embodiment [III] of the present invention, a known acid catalyst may be added to promote the cross-linking reaction between the polyester-modified vinyl resin [IIIA] and the phosphoric acid group-containing copolymer resin [IIIB], and furthermore, a film-forming resin such as an epoxy resin,, a cellulose type resin or an amino resin may be used in combination with the above resin components [IIIA] and [IIIB] according to need.

The process for the preparation of the aqueous dispersion type thermosetting coating composition of the present invention will now be described. A customary mechanical pulverization method adopted for preparation of conventional powdery paints and slurry paints may be used, but when the softening point of the starting resin composition is low, powdering is difficult according to this mechanical pulverization method because the stickiness of the resin composition is too high. The following special process, therefore, is advantageously adopted for the preparation of the aqueous dispersion type thermosetting coating composition of the present invention.

At first, predetermined amounts of the polyester-modified vinyl resin [IA], [IIA] or [IIIA] and the cross-linkable copolymer resin [IB], [IIB] or [IIIB] are dissolved, optionally together with a basic compound in an amount sufficient to neutralize a part of all of the acid groups, contained in the polyester-modified vinyl resin [IIA] or phosphoric acid group-containing copolymer resin [IIIB], a curing catalyst and other film-forming resin, into a water-soluble or water-miscible solvent such as mentioned above to form a resin solution. If desired, a pigment is incorporated in the solution and kneaded therewith to form a pigment dispersion.

As the solvent, there are employed those mentioned above with respect to the solution polymerization, and the amount of the solvent is adjusted so that the non-volatile component content in the solution or dispersion is 30 to 80% by weight.

Then, the so formed resin solution or pigment dispersion is dispersed in the fine particulate state into water in an amount sufficient to dissolve all of the water-soluble or water-miscible solvent contained in the resin solution or pigment dispersion. More specifically, the amount of water is at least 6 times the amount of the resin solution or pigment dispersion based on the weight, and in view of the facility of the subsequent step of filtering the resulting composition, it is preferred that the amount of water be up to about 40 times the amount of the resin solution or pigment dispersion based on the weight.

The dispersion of the resin solution or pigment dispersion may be accomplished according to a method in which the solution or pigment dispersion is dropped and poured into water being violently agitated or a method in which the solution or pigment dispersion is mixed with water by means of a line mixer. When the temperature of the liquid mixture is elevated by agitation and the resin particles are aggregated or integrated by softening of the resins, in order to prevent formation of coarse particles, it is preferred that the liquid mixture be cooled and the temperature be maintained below 30° C.

The above mentioned agitation or mixing by the line mixer is conducted until the solvent in the emulsified fine particles is transferred into water and resin particles are formed. Thus, the solvent contained in the dispersed fine particles is extracted into water to obtain the intended resin particles.

The so formed resin particles are separated from the water-solvent mixture by filtration or centrifugal separation, and if necessary, water washing and separation are repeated several times to obtain the resin particles in the form of a slurry or water-containing cake. Thus, resin particles having preferably an average particle size of about 1 to about 200 $\mu$ are obtained. Each of the so obtained resin particles includes both the polyester-modified vinyl resin and the cross-linkable copolymer resin. In other words, respective resin particles contain groups to be reacted with each other under heating, that is, hydroxyl and amide groups. Therefore, when the coating composition of the present invention is heated, a cross-linking reaction is caused both in the respective resin particles and among the resin particles, and a coating having excellent properties can be formed.

Then, a surface active agent and/or a thickener and water are added to the resin particles in the form of a slurry or water-containing cake, and the resin particles are finely pulverized by using a dispersing machine customarily used for the preparation of paints, such as a sand mill, a ball mill, a disperser, a Sussmeyer mill or a Centri mill so that the average particle size is adjusted to about 1 to about 50$\mu$.

It is preferred that the aqueous dispersion type thermosetting coating composition of the present invention contain the above-mentioned resin particles in the form of fine dispersed particles having an average particle size 1 to 50$\mu$. When the average particle size is smaller than 1$\mu$, the tendency of the particles to agglomerate is increased and popping is readily caused at the film-forming heating step. In short, in this case, properties of the coating composition resemble those of a water-soluble paint and good results cannot be obtained. When the average particle size exceeds 50$\mu$, sedimentation or cohesion of the resin particles is readily caused during storage, and a coating having a smooth surface is hardly obtained. Accordingly, such a large particle size is not preferred. When resin particles having an average particle size of 5 to 30$\mu$ are used, the resulting coating composition is excellent in storage stability and provides a smooth coating free of bubbling, and therefore, use of such resin particles is especially preferred in the present invention.

If necessary, the coating composition of the present invention may further comprise curing catalysts, organic or inorganic coloring or extender pigments customarily used in the field of paints, flash rusting preventing agents, flow modifiers, defoaming agents, precipitation-preventing agents, antiseptic agents, mildew-proofing agents and other additives, and film-forming resins such as water-soluble resin, hydrosols and emulsion resins. Since it is preferred that the softening point of the resin particles be 30° to 100° C., it is preferred that the total amount of the additive components that are not melted at the film-forming temperature be less than 50% by weight.

In the present invention, known non-ionic surface active agents, anionic surface active agents, cationic surface active agents and amphoteric surface agents can be used as the component (C).

As the non-ionic surface active agent that is used in the present invention, there can be mentioned, for example, sorbitan fatty acid esters, polyoxyethylene sorbitan fatty acid esters, polyoxyethylene sorbitol fatty acid esters, polyoxyethylene fatty acid esters, polyoxyethylene alcohol ethers, glycerin fatty acid esters, propylene glycol fatty acid esters, polyoxyethylene castor oil derivatives, polyoxyethylene alkylphenyl ethers, alkyl phosphates and polyoxyethyle phosphates. As the anionic surface acitve agent, there can be mentioned, for example, salts of alkyl sulfates, salts of polyoxyethylene alkyl ether sulfates, salts of alkyl sulfosuccinates and N-acylsarcosine salts. As the cationic surface active agent, there may be employed, for example, quaternary ammonium salts and pyridium salts.

From the viewpoints of the dispersion stability of the resin particles and properties of the resulting coating, it is preferred to use a non-ionic surface active agent, especially one having an HLB value of 8 to 18.

Any of thickeners customarily used for conventional aqueous resin paints can be used instead of or in combination with the surface active agent as the component (C) in the present invention.

As the thickener that can be used in the present invention, there can be mentioned, for example, cellulose type water-soluble resins such as methyl cellulose, ethyl cellulose and hydroxyethyl cellulose, polyvinyl alcohol, polyethylene type water-soluble resins such as polyethylene glycol ether and polyethylene oxide, maleic anhydride copolymer type water-soluble resins such as methyl vinyl ether-maleic anhyride copolymers, ethylene-maleic anhydride copolymers and styrene-maleic anhydride copolymers, ammonium, amine and sodium salts of acrylic acid type polymers, bentonite, polyvinyl pyrrolidone, alginic acid salts, polyacryloamide and partial hydrolysis products thereof, and natural water-soluble resins such as casein and gelatin.

The surface active agent and/or thickener is incorporated in an amount of 0.01 to 1.0% by weight based on the fine resin particles. If the amount of the surface active agent and/or thickener is less than 0.01% by weight, storage stability and adaptibility to the coating workability are degraded. If the amount of the surface active agent and/or thickener is larger than 1.0% by weight, the resulting coating is poor in smoothness and water resistance.

Among the above-mentioned thickeners, an amine salt of a carboxyl group-containing acrylic copolymer is especially preferred, because the resin is rendered water-insoluble by isolation of the amine under heating at the film-forming step and this resin does not degrade the water resistance of the resulting coating at all.

In the coating composition of the present invention, it is preferred that the mixing weight ratio of water to the fine resin particles be in the range of from 90/10 to 30/70.

If the amount of the resin particles is less than in the above mixing weight ratio range, since the solid concentration in the coating composition is too low and the viscosity is insufficient, if the coating composition is coated to an ordinary thickness, for example, 20 to 80$\mu$, by one coating operation, sagging is caused in the coating, and in order to avoid this defect, the coating operation should be conducted several times repeatedly. Accordingly, in this case, the adaptability to the coating workability is drastically lowered.

On the other hand, if the amount of the resin particles exceeds the above-mentioned mixing weight ratio range, homogenization is hardly attained by agitation or kneading at the paint-preparing step and the viscosity is outside the range suitable for various coating methods such as spray coating and electrostatic coating methods, and therefore, the adaptability to the coating workability is degraded and the practical utility of the coating composition is reduced.

Various known coating methods such as brush coating, dip coating, spray coating, electrostatic coating, curtain flow coating, shower coating and roll coating methods may be used for coating the aqueous dispersion type thermosetting coating composition of the present invention.

Conditions for heating and curing the coating composition of the present invention after the coating treatment vary to some extent depending on the contents of cross-linkable functional groups contained in the composition, the desired coating thickness and other factors, but ordinarily, a cured coating can be obtained by conducting the heat treatment at an appropriate temperature within the range of from 120° to 200° C. for 10 to 40 minutes.

The cured coating has both the merits of the polyester resin, such as good flexibility, good pigment dispersibility and good coating appearance, and the merits of the vinyl copolymer resin, such as high hardness and good stain resistance. Futhermore, yellowing or popping frequently caused when baking is conducted at a high temperature do not occur at all in the case of the coating composition of the present invention, and a cured coating having excellent properties can be obtained.

The present invention will now be described in detail with reference to the following Examples that by no means limit the scope of the invention.

In these Examples, all of "parts" and "%" are by weight.

The preparation of unsaturated polyester resin solutions, polyester-modified vinyl resin solutions and cross-linkable copolymer resin solutions used in Examples are first described.

[Preparation of Unsaturated Polyester Resin Solutions]

(1) Unsaturated polyester resin No. 1 (hereinafter referred to as "PE-1"):

A reaction vessel equipped with a stirrer, a thermometer, a cooling tube and a nitrogen gas-introducing tube was charged with 32.6 parts of isophthalic acid, 18.7 parts of adipic acid, 3.0 parts of fumaric acid, 29.0 parts of neopentyl glycol and 16.7 parts of trimethylol propane, and the reaction was carried out at 225° C. for about 8 hours under a nitrogen gas atmosphere to obtain a resin having an acid value of 15.1, a hydroxyl value of 155 and a weight average molecular weight of 6,700. The resin was diluted with methylethyl ketone so that the non-volatile component content was 60%, to form an unsaturated polyester resin solution PE-1.

(2) Unsaturated polyester resin No. 2 (hereinafter referred to as "PE-2"):

The same reaction vessel as used above for the preparation of PE-1 was charged with 32.3 parts of isophthalic acid, 15.1 parts of adipic acid, 3.0 parts of fumeric acid, 22.9 parts of neopentyl glycol, 17.4 parts of trimethylol propane and 9.3 parts of a glycidyl ester of a synthetic tertiary saturated fatty acid (manufactured and sold under the tradename "Cardura E" by Shell Chemicals Co. Ltd.), and the reaction was carried out at 225° C. for about 8 hours under a nitrogen gas atmosphere to obtain a resin having an acid value of 16.2, a hydroxyl value of 166 and a weight average molecular weight of 4,200. The resin was diluted with methylethyl ketone so that the non-volatile component content was 60% to obtain an unsaturated polyester resin solution PE-2.

(3) Unsaturated polyester resin No. 3 (hereinafter referred to as "PE-3"):

The reaction was carried out at 225° C. for about 6 hours under a nitrogen gas atmosphere in the same manner as described above for the preparation of PE-1 except that 32.6 parts of ortho-phthalic anhydride was used instead of 32.6 parts of isophthalic acid, to obtain a resin having an acid value of 45, a hydroxyl value of 158 and a weight average molecular weight of 2,450. The resin was diluted with methylethyl ketone so that the non-volatile component content was 60%, to obtain an unsaturated polyester resin solution PE-3. [Preparation of Polyester-Modified Vinyl Resin Solutions]

(1) A reaction vessel equipped with a stirrer, a thermometer, a dropping funnel, a cooling tube and a nitrogen gas-introducing tube was charged with 270 parts of methylethyl ketone and the temperature was elevated to 80° C., and a liquid mixture comprising 200 parts of methyl methacrylate, 150 parts of ethyl acrylate, 45 parts of 2-hydroxyethyl methacrylate, 5 parts of acrylic acid, 100 parts of the above-mentioned polyester resin PE-1 and 6 parts of azobisisobutyronitrile was added dropwise over a period of 3 hours. After completion of the dropwise addition, 1 part of azobisisobutyronitrile was further added, and the reaction temperature was elevated to 87° C. and the reaction was carried out for 4 hours to obtain a resin solution having a non-volatile component content of 62.0%. The resin was found to have an acid value of 11.6, a hydroxyl value of 110, a weight average molecular weight of 31,000 and a softening point of about 66° to about 68° C. The so formed resin solution was designated as PE-V-1.

(2) The reaction was carried out in the same manner as described above for the preparation of the polyester-modified vinyl resin solution PE-V-1 except that the polyester resin PE-3 was used instead of the polyester resin PE-1, to obtain a resin solution having a non-volatile component content of 59.8%. The resin was found to have an acid value of 14.9, a hydroxyl value of 118, a weight average molecular weight of 33,000 a softening point of about 69° to about 72° C. The so formed resin solution was designated as PE-V-2.

(3) The same reaction vessel as used for the preparation of the resin solution PE-V-1 was charged with 200 parts of methylethyl ketone and the temperature was elevated to 80° C., and a liquid mixture comprising 125 parts of methyl methacrylate, 10 parts of 2-ethylhexylacrylate, 110 parts of 2-ethylhexyl, methacrylate, 45 parts of 2-hydroxyethylmethacrylate, 5 parts of acrylic acid, 100 parts of the above-mentioned polyester resin PE-2 and 6 parts of azobisisobutyronitrile was added dropwise over a period of 3 hours. After completion of the dropwise addition, 1 part of azobisisobutyronitrile was further added and the reaction temperature was elevated to 87° C. and the reaction was carried out for 4 hours to obtain a resin solution having a non-volatile component content of 63.1%. The resin was found to have an acid value of 11.3, a hydroxyl value of 125, a weight average molecular weight of 27,000 and a softening point of about 70° to about 73° C. This resin solution was designated as PE-V-3.

(4) The reaction was carried out in the same manner as described above for the preparation of the polyester-modified vinyl resin solution PE-V-2 except that the polyester resin PE-2 was used instead of the polyester resin PE-3 and the amount of the polyester resin was changed to 200 parts, to obtain a resin solution having a non-volatile component content of 60.5%. The resin was found to have an acid value of 12.4, a hydroxyl value of 96, a weight average molecular weight of 49,000 and a softening point of about 65° to about 68° C. The so formed resin solution was designated as PE-V-4.

(5) The reaction was carried out in the same manner as described above for the preparation of the polyester-modified vinyl resin solution PE-V-1 except that 200 parts of styrene was used instead of methyl methacrylate and 100 parts of the polyester reisn PE-2 was used instead of the polyester resin PE-1, to obtain a resin solution having a non-volatile component content of 58.1%. The resin was found to have an acid value 9.1, a hydroxyl value of 115, a weight average molecular weight of 30,000 and a softening point of about 69° to about 72° C. This resin solution was designated as PE-V-5.

(6) A reaction vessel equipped with a stirrer, a thermometer, a dropping funnel, a cooling tube and a nitrogen gas-introducing tube was charged with 265 parts of methylethyl ketone and the temperature was elevated at 80° C. and a liquid mixture comprising 175 parts of methyl methacrylate, 35 parts of styrene, 145 parts of ethyl acrylate, 35 parts of 2-hydroxyethyl methacrylate, 5 parts of acrylic acid, 5 parts of acid phosphoxyethyl methacrylate, 100 parts of the above-mentioned polyester resin PE-2 and 6 parts of azobisisobutyronitrile was added dropwise over a period of 3 hours. After completion of the dropwise addition, I part of azobisisobutyronitrile was further added, and the reaction temperature was elevated to 87° C. and the reaction was carried out for 4 hours to obtain a resin solution having a non-volatile component content of 62.1%. The resin was found to have an acid value of 15.3, a hydroxyl value of 119, a weight average molecular weight of 83,000 and a softening point of about 79° to about 81° C. Then, trietylamine was added to the so formed resin solution in an amount of ⅔ mole per the acid value of the resin to effect neutralization. The resulting resin solution was designated as PE-PV-1.

(7) The reaction was carried out in the same manner as described above for the preparation of the resin solution PE-PV-1 except that the amount of methylethyl ketone was changed to 200 parts, the amount of methyl methacrylate was changed to 133 parts, the amount of styrene was changed to 25.5 parts, the amount of ethyl acrylate was changed to 109 parts, the amount of 2-hydroxyethyl methacrylate was changed to 26 parts, the amount of acrylic acid was changed to 4 parts, the amount of acid phosphoxymethyl methacrylate was changed to 2.5 parts and the amount of the polyester resin PE-2 was changed to 200 parts. A resin solution having a non-volatile component content of 61.9% was obtained. The resin was found to have an acid value of 15.0, a hydroxyl value of 93, a weight average molecular weight of 70,200 and a softening point of about 71° to about 74° C. The so formed resin solution was designated as PE-PV-2.

(8) The same reaction vessel was used for the preparation of PE-PV-1 was charged with 430 parts of methylethyl ketone and the temperature was elevated to 80° C., and a liquid mixture comprising 157.5 parts of methyl methacrylate, 15 parts of styrene, 12.5 parts of 2-ethylhexyl acrylate, 180 parts of 2-ethylhexyl methacrylate, 45 parts of 2-hydroxyethyl methacrylate, 5 parts of acrylic acid, 5 parts of acid phosphoxyethyl methacrylate, 5 parts of 3-chloro-2-acid-phosphoxypropyl methacrylate, 75 parts of the above-mentioned polyester resin PE-3 and 6 parts of azobisisobutyronitrile was added dropwise over a period of 3 hours. After completion of the dropwise addition, 1 part of azobisisobutyronitrile was further added, and the reaction temperature was elevated to 87° C. and the reaction was carried out for 4 hours to obtain a resin solution having a non-volatile component content of 50.5%. The resin was found to have an acid value of 20.6, a hydroxyl value of 103, a weight average molecular weight of 65,000 and a softening point of about 69° to about 73° C. Triethylamine was added to the so formed resin solution in an amount of ⅔ mole per the acid value of the resin to effect neutralization. The resulting solution was designated as PE-PV-3.

(9) The same reaction as used for the preparation of PE-PV-1 was charged with 250 parts of methylethyl ketone and the temperature was elevated to 80° C., and a liquid mixture comprising 157 parts of methyl methacrylate, 12.5 parts of 2-ethylhexyl acrylate, 138 parts of 2-ethylhexyl methacrylate, 56.5 parts of 2-hydroxyethyl methacrylate, 6 parts of acrylic acid, 5 parts of acid phosphoxyethyl methacrylate, 125 parts of the polyester resin PE-1 and 7.5 parts of azobisisobutyronitrile was added dropwise over a period of 3 hours. After completion of the dropwise addition, 1.2 parts of azobisisobutyronitrile was further added, and the reaction temperature was elevated to 87° C. and the reaction was carried out for 4 hours to obtain a resin solution having a non-volatile component content of 61.5%. The resin was found to have an acid value of 17.7, a hydroxyl value of 115, a weight average molecular weight of 32,100 and a softening point of about 67° to about 69° C. Triethylamine was added to the so obtained resin solution in an amount of $\frac{2}{3}$ mole per the acid value of the resin to effect neutralization. The resulting resin solution was designated as PE-PV-4.

(10)The reaction was carried out in the same manner as described above for the preparation of the resin solution PE-PV-1 except that the amount of methylethyl ketone, methyl methacrylate, styrene, ethyl acrylate, 2-hydroxyethyl methacrylate, acrylic acid, acid phosphoxyethyl methacrylate and the polyester resin PE-2 were changed to 750 parts, 190 parts, 50 parts, 180 parts, 10 parts, 5 parts, 25 parts and 40 parts, respectively. A resin solution having a non-volatile component content of 39.8% was obtained. The resin was found to have an acid value of 23.1, a hydroxyl value of 35, a weight average molecular weight of 34,200 and a softening point of about 71° to about 74° C. Triethylamine was added to the so obtained resin solution in an amount of $\frac{3}{4}$ mole per the acid value of the resin to effect neutralization. The resulting solution was designated as PE-PV-5.

(11) The reaction was carried out in the same manner as described above for the preparation of the resin solution PE-PV-1 except that 5 parts of acid phosphoxyethylacrylate was used instead of 5 parts of acid phosphoxyethyl methacrylate, to obtain a resin solution having a non-volatile component of 61.6%. The resin was found to have an acid value of 14.8, a hydroxyl value of 110, a weight average molecular weight of 80,500 and a softening point of about 78° to about 80° C. Triethylamine was added to the so formed resin solution in an amount of $\frac{2}{3}$ mole per the acid value of the resin to effect neutralization. The resulting resin solution was designated as PE-PV-6.

(12) A reaction vessel equipped with a stirrer, a thermometer a dropping funnel, a cooling tube and a nitrogen gas-introducing tube was charged with 300 parts of methylethyl ketone and the temperature was elevated to 80° C., and a liquid mixture comprising 75 parts of methyl methacrylate, 140 parts of styrene, 165 parts of ethyl acrylate, 10 parts of 2-hydroxyethyl methacrylate, 10 parts of acrylic acid, 50 parts of N-n butoxymethyl acrylamide, 50 parts of the polyester resin PE-1 and 6 parts of azobisisobutyronitrile was added dropwise over a period of 3 hours. After completion of the dropwise addition, 1 part of azobisisobutyronitrile was further added, and the reaction temperature was elevated to 87° C. and the reaction was carried out for 4 hours to obtain a resin solution having a non-volatile component content of 57.5%. The resin was found to have an acid value of 16.2, a hydroxyl value of 40.5, a weight average molecular weight of 61,500 and a softening point of about 66° to about 68° C. The so formed resin solution was designated as PE-AV-1.

(13) The same reaction vessel as used for the preparation of the resin solution PE-AV-1 was charged with 280 parts of methylethyl ketone and the temperature was elevated to 80° C., and a liquid mixture comprising 60 parts of methyl methacrylate, 145 parts of styrene, 155 parts of ethyl acrylate, 5 parts of 2-hydroxyethyl methacrylate, 10 parts of acrylic acid, 50 parts of N-n-butoxymethyl acrylamide, 75 parts of the polyester resin PE-2 and 6 parts of azobisisobutyronitrile was added dropwise over a period of 3 hours. After completion of the dropwise addition, 1 part of azobisisobutyronitrile was further added, and the reaction temperature was elevated to 87° C. and the reaction was carried out for 4 hours to obtain a resin solution having a nonvolatile component content of 58.1%. The resin was found to have an acid value of 17.4, a hydroxyl value of 67.0, a weight average molecular weight of 135,100 and a softening point of abut 67° to about 69° C. The so formed resin solution was designated as PE-AV-2.

(14) The reaction was carried out in the same manner as described above for the preparation of the resin solution PE-AV-2 except that the amounts of methyethyl ketone, ethyl acrylate, 2-hydroxyethyl methacrylate, N-n-butoxymethyl acrylamide and the polyester resin PE-2 were changed to 300 parts, 150 parts, 10 parts 75 parts and 50 parts, respectively. A resin solution having a non-volatile component content of 57.3% was obtained. The resin was found to have an acid value of 16.8%, a hydroxyl value of 42.5, a weight average molecular weight of 72,100 and a softening point of about 64° to about 67° C. The so obtained resin solution was designated as PE-AV-3.

(15) The same reaction vessel as used for the preparation of the resin solution PE-AV-1 was charged with 280 parts of methylethyl ketone and the temperature was elevated to 80° C., and a liquid mixture comprising 50 parts of methyl methacrylate, 135 parts of styrene, 145 parts of ethyl acrylate, 10 parts of 2-hydroxyethyl methacrylate, 10 parts of acrylic acid, 75 parts of N-n-butoxymethyl acrylamide, 75 parts of the polyester resin PE-3 and 6 parts of azobisisobutyronitrile was added dropwise over a period of 3 hours. After completion of the dropwise addition, 1 part of azobisisobutyronitrile was further added, and the reaction temperature was elevated to 87° C. and the reaction was carried out for 4 hours to obtain a resin solution having a non-volatile component content of 58.2%. The resin was found to have an acid value of 15.1, a hydroxyl value of 61.0, a weight average molecular weight of 97,500 and a softening point of about 63° to about 65° C. The so obtained resin solution was designed as PE-AV-4.

[Preparation of Cross-Linkable Copolymer Resin Solutions]

(1) A reaction vessel equipped with a stirrer, a thermometer, a dropping funnel, a cooling tube and a nitrogen gas-introducing tube was charged with 340 parts of methyethyl ketone and the temperature was elevated to 80° C., and a liquid mixture comprising 50 parts of methyl methacrylate, 150 parts of styrene, 165 parts of ethyl acrylate, 125 parts of N-n-butoxymethyl acrylamide, 10 parts of acrylic acid and 10 parts of azobisisobutyronitrile was added dropwise over a period of 3 hours. After completion of the dropwise addition, 1.5 parts of azobisisobutyronitrile was further added, and the reaction temperature was elevated to 87° C. and the reaction was carried out for 4 hours to obtain a resin solution having a non-volatile component content of 58.4%. The resin was found to have an acid value of 12.0, a weight average molecular weight of 38,000 and a softening point of about 73° to about 75° C. The so obtained resin solution was designated as V-1.

(2) The same reaction vessel as used for the preparation of the resin solution V-1 was charged with 340 parts of methylethyl ketone and the temperature was elevated to 80° C., and a liquid mixture comprising 150 parts of methyl methacrylate, 65 parts of styrene, 175 parts of ethyl acrylate, 100 parts of N-n-butoxymethyl acrylamide, 10 parts of acrylic acid and 10 parts of azobisisobutyronitrile was added dropwise over a period of 3 hours. After completion of the dropwise addition, 1.5 parts of azobisisobutyronitrile was further added, and the reaction temperature was elevated to 87° C. and the reaction was carried out for 4 hours to obtain a resin solution having a non-volatile content of 59.0%. The resin was found to have an acid value of 13.9, a weight average molecular weight of 42,000 and a softening point of about 72° to about 75° C. The so formed resin solution was designated as V-2.

(3) A reaction vessel equipped with a stirrer, a thermometer, a dropping funnel, a cooling tube and a nitrogen gas-introducing tube was charged with 340 parts of methylethyl ketone and the temperature was elevated to 80° C., and a liquid mixture comprising 190 parts of methyl methacrylate, 80 parts of styrene, 210 parts of ethyl acrylate, 10 parts of 2-hydroxyethyl methacrylate, 5 parts of acid phosphoxyethyl methacrylate, 5 parts of acrylic acid and 10 parts of azobisisobutyronitrile was added dropwise over a period of 3 hours. After completion of the dropwise addition, 1.5 parts of azobisisobutyronitrile was further added, and the reaction temperature was elevated to 87° C. and the reaction was carried out for 4 hours to obtain a resin solution having a non-volatile component content of 59.0%. The resin was found to have an acid value of 11.4, a weight average molecular weight of 25,000 and a softening point of about 71° to about 73° C. Triethylamine was added to the so formed resin solution in an amount of $\frac{2}{3}$ mole per the acid value of the resin to effect neutralization. The resulting resin solution was designated as PV-1.

(4) The same reaction vessel as used for the preparation of the resin solution PV-1 was charged with 340 parts of methylethyl ketone and the temperature was elevated to 80° C., and a liquid mixture comprising 190 parts of methyl methacrylate, 70 parts of styrene, 215 parts of ethyl acrylate, 10 parts of 2-hydroxyethyl methacrylate, 10 parts of acid phosphoxyethyl methacrylate, 5 parts of acrylic acid and 10 parts of azobisisobutyronitrile was added dropwise over a period of 3 hours. After completion of the dropwise addition, 1.5 parts of azobisisobutyronitrile was further added, and the reaction temperature was elevated to 87° C. and the reaction was carried out for 4 hours to obtain a resin solution having a non-volatile component content of 59.0%. The resin was found to have an acid value of 13.7, a weight average molecular weight of 30,800 and a softening point of about 72° to about 75° C. Triethylamine was added to the so formed resin solution in an amount of $\frac{2}{3}$ mole per the acid value of the resin to effect neutralization. The resulting resin solution was designated as PV-2.

(5) The reaction was carried out in the same manner as described above for the preparation of the resin solution PV-2 except that the amounts of ethyl acrylate and acid phosphoxethyl methacrylate were changed to 200 parts and 25 parts, respectively, to obtain a resin solution having a non-volatile component content of 60.1%. The resin was found to have an acid value of 28.8, a weight average molecular weight of 31,100 and a softening point of about 73° to about 76° C. Triethylamine was added to the so obtained solution in an amount of $\frac{3}{4}$ mole per the acid value of the resin to effect neutralization. The resulting resin solution was designated as PV-3.

(6) The same reaction vessel as used for the preparation of the resin solution PV-1 was charged with 750 parts of methylethyl ketone and the temperature was elevated to 80° C., and a liquid mixture comprising 190 parts of methyl methacrylate, 55 parts of styrene, 195 parts of ethyl acrylate, 15 parts of 2-hydroxyethyl methacrylate, 40 parts of acid phosphoxyethyl methacrylate, 5 parts of acrylic acid and 10 parts of azobisisobutyronitrile was added dropwise over a period of 3 hours. After completion of the dropwise addition, 1.5 parts of azobisisobutyronitrile was further added, and the reaction temperature was elevated to 87° C. and the reaction was carried out for 4 hours to obtain a resin solution having a non-volatile component content of 39.5%. The resin was found to have an acid value of 31.6, a weight average molecular weight of 22,500 and a softening point of about 73° to about 76° C. Triethylamine was added to the so formed resin solution in an amount of $\frac{3}{4}$ mole per the acid value of the resin to effect neutralization. The resulting resin solution was designated as PV-4.

(7) The same reaction vessel as used for the preparation of the resin solution PV-1 was charged with 340 parts of methylethyl ketone and the temperature was elevated to 80° C., and a liquid mixture comprising 190 parts of methyl methacrylate, 70 parts of styrene, 215 parts of ethyl acrylate, 10 parts of 2-hydroxyethyl methyacrylate, 5 parts of acid phosphoxyethyl methacrylate, 5 parts of 3-chloro-2-acid-phosphoxypropyl methacrylate, 5 parts of acrylic acid and 10 parts of azobisisobutyronitrile was added dropwise over a period of 3 hours. After completion of the dropwise addition, 1.5 parts of azobisisobutyronitrile was further added, and the reaction temperature was elevated to 87° C. and the reaction was carried out for 4 hours to obtain a resin solution having a non-volatile component content of 59.3%. The resin was found to have an acid value of 14.5, a weight average molecular weight of 33,100 and a softening point of about 73° to about 75° C. Triethylamine was added to the so obtained resin solution in an amount of $\frac{2}{3}$ mole per the acid value of the resin to effect neutralization. The resulting resin solution was designated as PV-5.

(8) The reaction was carried out in the same manner as described above for the preparation of the resin solution PB-1 except that 5 parts of acid phosphoxyethyl acrylate was used instead of 5 parts of acid phosphoxyethyl methacrylate, to obtain a resin solution having a non-volatile component content of 58.9%. The resin was found to have an acid value of 11.9, a weight average molecular weight of 28,900 and a softening point of about 72° to about 74° C. Triethylamine was added to the so obtained solution in an amount of $\frac{3}{4}$ mole per the acid value of the resin to effect neutralization. The resulting resin solution was designated as PV-6.

EXAMPLE 1

To 24 parts of the resin solution PE-V-1 were added 12 parts of titanium dioxide and 4.5 parts of methyethyl ketone, and the mixture was dispersed by a sand mill so that the dispersed particle size was smaller than 10$\mu$ (as measured according to the grind gauge; the same will apply hereinafter). Then, the dispersed mixture was mixed under agitation with 56 parts of the resin solution V-1 and 3.5 parts of methylethyl ketone to form a homogeneous pigment dispersion. The dispersion was dropped into 2000 parts of water maintained at 15° C.

and agitated at a high speed to emulsify the pigment dispersion, extract the solvent into water and form resin particles. Filtration and water washing were repeated to obtain a water-containing cake of resin particles having an average particle size of about 100 μ. The water content in the cake was about 50%. To 100 parts of the so obtained water-containing cake were added 0.3 part of a 40% aqueous solution of a non-ionic surface active agent (manufactured and sold under the tradename "Emalgen 930" by Kao Atlas Co. Ltd. and having an HLB value of 15.1) and 2 parts of a 10% aqueous solution of a thickener composed of an alkali metal salt of an acrylic acid type copolymer, and the mixture was dispersed and kneaded by a sand mill to finely pulverize the resin particles. A slurry paint containing resin particles having an average particle size of 15 μ and having a pH value of 7.5 was thus obtained.

EXAMPLE 2

A slurry paint containing resin particles having an average particle size of 15μ and having a pH value of 7.2 was prepared in the same manner as described in Example 1 except that the resin solution PE-V-2 was used instead of the resin solution PE-V-1 used in Example 1.

EXAMPLE 3

To 24 parts of the resin solution PE-V-3 were added 12 parts of titanium dioxide and 4.5 parts of methylethyl ketone, and the mixture was dispersed by a sand mill so that the dispersed particle size was smaller than 10μ. The dispersed mixture was mixed under agitation with 16 parts of the resin solution PE-V-3, 40 parts of the resin solution V-1 and 3.5 parts of methylethyl ketone to form a homogeneous pigment dispersion. The dispersion was sprayed into 3000 parts of water maintained at 20° C. and agitated at a high speed to emulsify the pigment dispersion, extract the solvent into water and form resin particles. Filtration and water washing were repeated to obtain a water-containing cake of resin particles having an average particle size of 150μ. The water content in the cake was about 50%. To 100 parts of the so obtained cake were added 0.4 part of a 40% aqueous solution of a non-ionic surface active agent (manufactured and sold under tradename "Emalgen 910" by Kao Atlas Co. Ltd. and having an HLB value of 12.2) and 4 parts of a 5% aqueous solution of a thickener (hydroxyethyl cellulose), and the mixture was dispersed by a ball mill to finely pulverize the resin particles. A slurry paint containing resin particles having an average particle size of 15μ and having a pH value of 7.6 was thus obtained.

EXAMPLE 4

A slurry paint containing resin particles having an average particle size of 15μ and having a pH value of 7.5 was prepared in the same manner as described in Example 3 except that the resin solution PE-V-4 was used instead of the resin solution PE-V-3 used in Example 3.

EXAMPLE 5

A slurry paint containing resin particles having an average particle size of 15μ and having a pH value of 7.3 was prepared in the same manner as described in Example 1 except that the amount of the resin solution PE-V-1 was changed to 40 parts from 24 parts and the amount of the resin solution V-1 was changed to 40 parts from 56 parts.

EXAMPLE 6

A slurry paint containing resin particles having an average particle size of 15μ and having a pH value of 7.5 was prepared in the same manner as described in Example 3 except that the amount of the resin solution PE-V-3 was changed to 8 parts from 40 parts and the amount of the resin solution V-1 was changed to 72 parts from 40 parts.

EXAMPLE 7

To 24 parts of the resin solution PE-V-5 were added 12 parts of titanium dioxide, 0.5 part of a flow modifier (manufactured and sold under the tradename "Modaflow" by Monsanto Chemical Co. Ltd.) and 4.0 parts of methylethyl ketone, and the mixture was dispersed by a sand mill so that the dispersed particle size was smaller than 10μ. Then, 56 parts of the resin solution V-2 and 3.5 parts of methylethyl ketone were added to the dispersed mixture, and the resulting mixture was blended under agitation to form a pigment dispersion. The dispersion was dropped into 2000 parts of water maintained at 15° C. and agitated at a high speed to emulsify the pigment dispersion, extract the solvent into water and form resin particles. Filtration and water washing were repeated to obtain a water-containing cake of resin particles having an average particle size of about 100μ. The water content in the cake was about 50%. To 100 parts of the so obtained water-containing cake were added 0.2 part of a 50% aqueous solution of a non-ionic surface active agent (manufactured and sold under the tradename "Emalgen 935" by Kao Atlas Co. Ltd. and having an HLB value of 17.5) and 2 parts of a 10% aqueous solution of a thickener composed of an alkali metal salt of an acrylic acid type copolymer, and the mixture was dispersed by a sand mill to finely pulverize the resin particles. A slurry paint containing resin particles having an average particle size of 13μ and having a pH value 7.3 was thus obtained.

COMPARATIVE EXAMPLE 1

The reaction was carried out in the same manner as described above for the preparation of the polyester-modified vinyl resin solution PE-V-1 used in Example 1 except that the modifying polyester resin PE-1 was not used, to obtain a resin solution having a non-volatile component content of 60.2%. The resin was found to have an acid value of 11.3, a hydroxyl value of 53 and a weight average molecular weight of 11,500. To 24 parts of the so obtained resin solution were added 12 parts of titanium dioxide and 4.5 parts of methylethyl ketone, and the mixture was dispersed so that the dispersed particle size was smaller than 10μ. Then, the so dispersed mixture was mixed with 36 parts of the above resin solution, 20 parts of a 60% methyethyl ketone solution of a butylated methylol-melamine resin having an average condensation degree of 2.5, an etherification degree of 2.5 and a water-soluble component content lower than 1% and 3.5 parts of methylethyl ketone, and the resulting mixture was blended and agitated to form a homogeneous pigment dispersion. The dispersion was then treated in the same manner as described in Example 1, to obtain a slurry paint containing resin particles having an average particle size of 15μ and having a pH value of 7.7.

COMPARATIVE EXAMPLE 2

The reaction was carried out in the same manner as described above for the preparation of the polyester-modified vinyl resin solution PE-V-3 used in Example 3 except that the polyester resin PE-2 was not used, to obtain a resin solution having a non-volatile component content of 59.8%. The resin was found to have an acid value of 11.9, a hydroxyl value of 55 and a weight average molecular weight of 13,100. To 24 parts of the so obtained resin solution were added 12 parts of titanium dioxide and 4.5 parts of methylethyl ketone, and the mixture was dispersed by a ball mill so that the dispersed particle size was smaller than 10μ. To the dispersed mixture were added 41 parts of the above resin solution, 15 parts of a blocked isocyanate resin (manufactured and sold under the tradename "Crelan Ue 6109" by Bayer AG), 0.5 part of dibutyltin dilaurate (dissociation catalyst) and 3 parts of methylethyl ketone, and the resulting mixture was blended and agitated to obtain a homogeneous pigment dispersion. The so formed dispersion was then treated in the same manner as described in Example 3 to obtain a slurry paint containing resin particles having an average particle size of 15μ and having a pH value of 7.5.

COMPARATIVE EXAMPLE 3

A slurry paint containing resin particles having an average particle size of 15μ and having a pH value of 7.3 was prepared in the same manner as described in Example 3 except that the vinyl resin solution used in Comparative Example 2 was used instead of the resin solution RE-V-3 used in Example 3.

The slurry paints obtained in Examples 1 to 7 and Comparative Examples 1 to 3 were independently spray-coated on polished soft steel plates, pre-heated at 90° C. for 10 minutes and heated and dried at a predetermined temperature to obtain coatings having a thickness of about 35μ. Baking conditions and the results of tests of physical properties of the resulting coatings are shown in Table 1.

TABLE 1

| | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Baking Conditions | | | | | | | | | | |
| Temperature (°C.) | 160 | 200 | 180 | 150 | 170 | 170 | 190 | 160 | 170 | 180 |
| Time (minutes) | 20 | 20 | 20 | 20 | 20 | 20 | 20 | 20 | 20 | 20 |
| Appearance of Coating | | | | | | | | | | |
| Popping[1] | none | none | none | none | none | none | none | observed | none | none |
| Yellowing resistance[2] | good | good | good | good | good | good | good | good | poor | poor |
| Gloss[3] | 88 | 87 | 89 | 87 | 89 | 87 | 90 | 86 | 88 | 86 |
| Physical Properties of Coating | | | | | | | | | | |
| Pencil hardness[4] | 2H | 3H | 2H | H | 2H | H | 2H | 3H | H | F |
| Adhesion[5] | 100/100 | 100/100 | 100/100 | 100/100 | 100/100 | 100/100 | 100/100 | 60/100 | 95/100 | 80/100 |
| Erichsen test[6] | 7< | 7< | 7< | 7< | 7< | 7< | 7< | 2.0 | 3.5 | 5.0 |
| Impact resistance[50] | >50 | >50 | 40 | 50 | 40 | 50 | 10 | 10 | 20 | |
| Solvent resistance[8] | | | O | O | O | | O | | O | X |
| Adhesion after humidity resistance test[9] | | | O | | O | O | O | X | O | X |

Note
[1,2]evaluated based on naked eye observation
[3]60°/60° specular gloss
[4]the point of pencil (Mitsubishi Uni) was put on the coating at an angle of 45° and lightly pressed forward, and pencil hardness was expressed by the hardness of hardest pencil that did not leave any trace on the coating
[5]cross-cut adhesive tape peel test
[6]tested by using Erichsen tester
[7]according to method 3B, JIS K-5400, 6-13
[8]rubbing test using ethyl acetate was conducted 50 times and delustering degree was examined
change
O slight delustering
X considerable delustering
[9]cross-cut adhesive tape test after 200 hours' humidity resistance test (50° C., 97% RH<)
100/100-90/100
O 89/100-60/100
X 59/100-0/100

EXAMPLE 8

To 24 parts of the resin solution PE-PV-1 were added 12 parts of titanium dioxide and 4.5 parts of methylethyl ketone, and the mixture was dispersed so that the dispersed particle size was smaller than 10μ (according to the grind gauge; the same hereinafter). To the dispersed mixture were added 16 parts of the resin solution PE-PV-1, 40 parts of the resin solution V-1 and 3.5 parts of methylethyl ketone, and the resulting mixture was blended and agitated to form a homogeneous pigment dispersion. The dispersion was dropped into 2000 parts of water maintained at 15° C. and agitated at a high speed to emulsify the pigment dispersion, extract the solvent into water and form resin particles. Filtration and water washing were repeated to obtain a water-containing cake of resin particles having an average particle size of about 100μ. The water content in the cake was about 50%. To 100 parts of the so obtained cake were added 0.3 part of a 40% aqueous solution of a non-ionic surface active agent (manufactured and sold under the tradename "Emalgen 930" by Kao Atlas Co. Ltd. and having an HLB value of 15.1) and 2 parts of a 10% aqueous solution of a thickener composed of an alkali metal salt of an acrylic acid type copolymer, and the mixture was dispersed by a sand mill to finely pulverize the resin particles. A slurry pain containing resin particles having an average particle size of 16μ and having a pH value of 7.8 was thus obtained.

EXAMPLE 9

A slurry paint containing resin particles having an average particle size of 16μ and having a pH value of 7.6 was prepared in the same manner as described in Example 8 except that the resin solution PE-PV-2 was used instead of the resin solution PE-PV-1 used in Example 8.

EXAMPLE 10

To 24 parts of the resin solution PE-PV-3 were added 12 parts of titanium dioxide and 4.5 parts of methylethyl ketone, and the mixture was dispersed so that the dispersed particle size was smaller than 10μ. The dispersed mixture was then mixed with 56 parts of the resin solution V-2 and 3.5 parts of methylethyl ketone, and the resulting mixture was blended and agitated to obtain a homogeneous pigment dispersion. The dispersion was sprayed into 3000 parts of water maintained at 20° C. and agitated at a high speed to emulsify the pigment dispersion, extract the solvent into water and form resin particles. Filtration and water washing were repeated to obtain a water-containing cake of resin particles having an average particle size of 150μ. The water content in the cake was about 50%. To 100 parts of the so obtained cake were added 0.4 part of a 40% aqueous solution of a non-ionic surface active agent (manufactured and sold under the tradename "Emalgen 910" by Kao Atlas Co. Ltd. and having an HLB value of 12.2) and 4 parts of a 5% aqueous solution of a thickener (hydroxyethyl cellulose), and the mixture was dispersed and kneaded by a ball mill to finely pulverize the resin particles. A slurry paint containing resin particles having an average particle size of 14μ and having a pH value of 7.9 was thus obtained.

EXAMPLE 11

To 24 parts of the resin solution PE-PV-4 were added 12 parts of titanium dioxide, 0.5 part of a flow modifier (manufactured and sold under the tradename "Modaflow" by Monsanto Chemical Co. Ltd.) and 4.0 parts of methylethyl ketone, and the mixture was dispersed by a sand mill so that the dispersed particle size was smaller than 10μ. Then, the dispersed mixture was mixed with 24 parts of the resin solution PE-PV-4, 32 parts of the resin solution V-1 and 3.5 parts of methylethyl ketone, and the resulting mixture was blended and agitated to form a homogeneous pigment dispersion. The subsequent operations were conducted in the same manner as described in Example 8 to obtain a slurry paint containing resin particles having an average particle size of 15μ and having a pH value of 7.7.

EXAMPLE 12

To 40 parts of the resin solution PE-PV-5 were added 10 parts of titanium dioxide and 0.5 part of a flow modifier (manufactured and sold under the tradename "Modaflow" by Monsanto Chemical Co. Ltd.), and the mixture was dispersed by a sand mill so that the dispersed particle size was smaller than 10μ. The dispersed mixture was mixed with 30 parts of the resin solution PE-PV-5, 12 parts of the resin solution V-2 and 7.5 parts of methylethyl ketone, and the resulting mixture was blended and agitated to form a homogeneous pigment dispersion. The subsequent operations were conducted in the same manner as described in Example 8 to obtain a slurry paint containing resin particles having an average particle size of 14μ and having a pH value of 7.8.

EXAMPLE 13

To 24 parts of the resin solution PE-PV-6 were added 12 parts of titanium dioxide, 0.5 part of a flow modifier (manufactured and sold under the tradename "Modaflow" by Monsanto Chemical Co. Ltd.) and 4.0 parts of methylethyl ketone, and the mixture was dispersed by a sand mill so that the dispersed particle size was smaller than 10μ. The dispersed mixture was mixed with 8 parts of the resin solution PE-PV-6, 48 parts of the resin solution V-1 and 3.5 parts of methylethyl ketone, and the resulting mixture was blended and agitated to form a homogeneous pigment dispersion. The subsequent operations were conducted in the same manner as described in Example 8 to obtain a slurry paint containing resin particles having an average particle size of 15μ and having a pH value of 7.6.

COMPARATIVE EXAMPLE 4

The reaction was carried out in the same manner as described above for the preparation of the polyester-modified vinyl resin solution PE-PV-1 used in Example 8 except that the modifying polyester resin PE-2 was not used and acid phosphoxyethyl methacrylate was not added, to obtain a resin solution having a non-volatile component content of 58.9%. The resin was found to have an acid value of 11.9, a hydroxyl value of 49 and a weight average molecular weight of 12,200. To 24 parts of the so obtained resin solution were added 12 parts of titanium dioxide and 4.5 parts of methylethyl ketone, and the mixture was dispersed by a sand mill so that the dispersed particle size was smaller than 10μ. The dispersed mixture was mixed with 36 parts of the above resin solution, 20 parts of a 60% methylethyl ketone solution of a butylated methylolmelamine resin having an average condensation degree of 2.5, an etherification degree of 2.5 and a water-soluble component content lower than 1% and 3.5 parts of methylethyl ketone, and the resulting mixture was blended and agitated to form a homogeneous pigment dispersion. The subsequent operations were conducted in the same manner as described in Example 8 to obtain a slurry paint containing resin particles having an average particle size of 15μ and having a pH value of 7.4.

COMPARATIVE EXAMPLE 5

The reaction was carried out in the same manner as described above for the preparation of the polyester-modified vinyl resin solution PE-PV-3 used in Example 10 except that the polyester resin PE-3 was not used and acid phosphoxyethyl methacrylate and 3-chloro-2-acid-phosphoxypropyl methacrylate were not added, to obtain a resin solution having a non-volatile component content of 59.2%. The resin was found to have an acid value of 11.3, a hydroxyl value of 51 and a weight average molecular weight of 18,500. To 24 parts of the so obtained resin solution were added 12 parts of titanium dioxide and 4.5 parts of methylethyl ketone, and the mixture was dispersed by a ball mill so that the dispersion particle size was smaller than 10μ. The dispersed mixture was mixed with 41 parts of the above resin solution, 15 parts of a blocked isocyanate resin (manufactured and sold under the tradename "Crelan Ue 6109" by Bayer AG), 0.5 parts of dibutyltin dilaurate (dissociation catalyst) and 3 parts of methylethyl ketone, and the resulting mixture was blended and agitated to form a homogeneous pigment dispersion. The subsequent operations where conducted in the same manner as described in Example 10 to obtain a slurry paint containing resin particles having an average particle size of 15μ and having a pH value of 7.4.

COMPARATIVE EXAMPLE 6

A slurry paint containing resin particles having an average particle size of 15μ and having a pH value of 7.4 was prepared in the same manner as described in Example 10 except that the vinyl resin solution used in Comparative Example 5 was used instead of the resin solution PE-PV-3 used in Example 10.

The slurry paints prepared in Examples 8 to 13 and Comparative Examples 4 to 6 were independently spray-coated on polished soft steel plates, set for 5 minutes, pre-heated at 90° C. for 10 minutes and heated and dried at a predetermined temperature to obtain coatings having a thickness of about 35μ. The packing conditions and the results of tests of physical properties of the coatings are shown in Table 2.

TABLE 2

| | Example 8 | Example 9 | Example 10 | Example 11 | Example 12 | Example 13 | Comparative Example 4 | Comparative Example 5 | Comparative Example 6 |
|---|---|---|---|---|---|---|---|---|---|
| Baking Conditions | | | | | | | | | |
| Temperature (°C.) | 160 | 190 | 150 | 200 | 180 | 180 | 160 | 170 | 180 |
| Time (minutes) | 20 | 20 | 20 | 20 | 20 | 20 | 20 | 20 | 20 |
| Appearance of Coating | | | | | | | | | |
| Flash rusting[1] | none | none | none | none | none | none | observed | observed | observed |
| Popping | none | none | none | none | none | none | observed | none | none |
| Yellowing resistance | good | good | good | good | good | good | good | poor | good |
| Gloss | 86 | 88 | 86 | 89 | 86 | 87 | 86 | 88 | 86 |
| Physical Properties of Coating | | | | | | | | | |
| Pencil hardness | 2H | 3H | H | 3H | H | 2H | 3H | H | F |
| Adhesion | 100/100 | 100/100 | 100/100 | 100/100 | 100/100 | 100/100 | 60/100 | 90/100 | 80/100 |
| Erichsen test | 7< | 7< | 7< | 7< | 7< | 7< | 2.0 | 3.0 | 4.0 |
| Impact resistance | >50 | >50 | >50 | 40 | 30 | >50 | 10 | 10 | 20 |
| Solvent resistance | | | O | | O | | | O | X |
| Adhesion after humidity resistance test | | | | | | | X | O | X |
| Adhesion after salt spray resistance test[2] | | | | | O | | X | X | X |
| Storage Stability of Composition[3] | 10< | 10< | 10< | 10< | 10< | 10< | 7 | 5 | 5 |

Note
[1]evaluated based on naked eye observation during setting
[2]sample cross-cut to the substrate was tested for 100 hours by salt spray tester (JIS Z-2371), and cross-cut portion was subjected to adhesive cellophane tape peel test and peel width (on one side) was measured
0-1.0 mm
1.1-2.0 mm
2.1-3.0 mm
X 3.1 mm or more
[3]sample was stored in air bath maintained at 50° C. and stability was expressed by the number of days which passed without occurrence of gelation or precipitation
Other items are the same as described in Table 1.

EXAMPLE 14

To 24 parts of the resin solution PE-AV-1 were added 12 parts of titanium dioxide and 4.5 parts of methylethyl ketone, and the mixture was dispersed by a pot mill so that the dispersed particle size was smaller than 10μ (measured according to the grind gauge; the same hereinafter). The dispersed mixture was mixed with 51 parts of the resin solution PE-AV-1, 10 parts of the resin solution PV-4 and 3.5 parts of methylethyl ketone, and the resulting mixture was blended and agitated to obtain a homogeneous pigment dispersion. The pigment dispersion was dropped in 2000 parts of water maintained at 15° C. and agitated at a high speed to emulsify the pigment dispersion, extract the solvent into water and form resin particles. Filtration and water washing were repeated to obtain a water-containing cake of resin particles having an average particle size of about 100μ. The water content in the cake was about 50%. To 100 parts of the so obtained cake were added 0.3 part of a 40% aqueous solution of a non-ionic surface active agent (manufactured and sold under the tradename "Emalgen 930" by Kao Atlas Co. Ltd.) and 2 parts of a 10% aqueous solution of a thickener composed of an alkali metal salt of an acrylic acid type copolymer, and the mixture was dispersed by a sand mill to finely pulverize resin particles. A slurry paint containing resin particles having an average particle size of 15μ and having a pH value of 7.7 was thus obtained.

EXAMPLE 15

To 24 parts of the resin solution PE-AV-2 were added 12 parts of titanium dioxide, 0.5 part of a flow modifier (manufactured and sold under the tradename "Modaflow" by Monsanto Chemical Co. Ltd.) and 4.0 parts of methylethyl ketone, and the mixture was dispersed by a sand mill so that the dispersed particle size was smaller than 10μ. The dispersed mixture was mixed with 40 parts of the resin solution PE-AV-2, 16 parts of the resin solution PV-3 and 3.5 parts of methylethyl ketone, and the resulting mixture was blended and agitated to form a homogeneous pigment dispersion. The dispersion was dropped in 2000 parts of water maintained at 15° C. and agitated at a high speed to emulsify the pigment dispersion, extract the solvent into water and form resin particles. Filtration and water washing were repeated to obtain a water-containing cake of resin particles having an average particle size of about 100μ. The water content in the cake was about 50%. To 100 parts of the so obtained water-containing cake were added 0.3 part of a 40% aqueous solution of a non-ionic surface active agent (manufactured and sold under the tradename "Emalgen 930" by Kao Atlas Co. Ltd. and having an HLB value of 15.1) and 2 parts of a 10% aqueous solution of a thickener composed of an alkali metal salt of an acrylic acid type copolymer, and the mixture was dispersed by a sand mill to finely pulverize the resin particles. A slurry paint containing resin particles having an average particle size of 15μ and having a pH value of 7.5 was thus obtained.

EXAMPLE 16

To 24 parts of the resin solution PE-AV-3 were added 12 parts of titanium dioxide and 4.5 parts of methylethyl ketone, and the mixture was dispersed by a ball mill so that the dispersed particle size was smaller than 10μ. The dispersed mixture was mixed with 32 parts of the resin solution PE-AV-3, 24 parts of the resin solution PV-2 and 3.5 parts of methylethyl ketone, and the resulting mixture was blended and agitated to form a homogeneous pigment dispersion. The pigment dispersion was sprayed into 3000 parts of water maintained at 20° C. and agitated at a high speed to emulsify the pigment dispersion, extract the solvent into water and form resin particles. Filtration and water washing were repeated to obtain a water-containing cake of resin particles having an average particle size of 150μ. The water content in the cake was about 50%. To 100 parts of the so obtained water-containing cake were added 0.4 parts of a 40% aqueous solution of a non-ionic surface active agent (manufactured and sold under the tradename "Emalgen 910" by Kao Atlas Co. Ltd. and having and HLB value of 12.2) and 4 parts of a 5% aqueous solution of a thickener (hydroxyethyl cellulose), and the mixture was dispersed and kneaded by a ball mill to finely pulverize the resin particles. A slurry paint containing resin particles having an average particle size of 16μ and having a pH value of 7.8 was thus obtained.

EXAMPLE 17

To 24 parts of the resin solution PE-AV-4 were added 12 parts of titanium dioxide, 0.5 part of a flow modifier (manufactured and sold under the tradename "Modaflow" by Monsanto Chemical Co. Ltd.) and 4.0 parts of methylethyl ketone, and the mixture was dispersed by a sand mill so that the dispersed particle size was smaller than 10μ. The dispersed mixture was mixed with 8 parts of the resin solution PE-AV-4, 48 parts of the resin solution PV-1 and 3.5 parts of methylethyl ketone, and the resulting mixture was blended and agitated to form a homogeneous pigment dispersion. The pigment dispersion was dropped in 2000 parts of water maintained at 15° C. and agitated at a high speed to emulsify the pigment dispersion, extract the solvent into water and form resin particles. Filtration and water washing were repeated to obtain a water-containing cake of resin particles having an average particle size of about 100μ. The water content in the cake was about 50%. To 100 parts of the so obtained water-containing cake were added 0.2 part of a 50% aqueous solution of a non-ionic surface active agent (manufactured and sold under the tradename "Emalgen 935" by Kao Atlas Co. Ltd. and having an HLB value of 17.5) and 2 parts of a 10% aqueous solution of a thickener composed of an alkali metal salt of an acrylic acid thpe copolymer, and the resulting mixture was dispersed by a sand mill to finely pulverized resin particles. A slurry paint containing resin particles having an average particle size of 14μ and having a pH value of 7.7 was thus obtained.

EXAMPLE 18

A slurry paint containing resin particles having an average particle size of 15μ and having a pH value of 7.6 was prepared in the same manner as described in Example 17 except that the total amount of the resin solution PE-AV-4 was changed to 40 parts from 32 parts and 40 parts of the resin solution PV-2 was used instead of 48 parts of the resin solution PV-1.

EXAMPLE 19

To 24 parts of the resin solution PE-AV-3 were added 12 parts of titanium dioxide, 0.5 part of a flow modifier (manufactured and sold under the tradename "Modaflow" by Monsanto Chemical Co. Ltd.) and 4.0 parts of methylethyl ketone, and the mixture was dispersed by a sand mill so that the dispersed particle size was smaller than 10μ. The dispersed mixture was mixed with 32 parts of the resin solution PE-AV-3, 24 parts of the resin solution PV-5 and 3.5 parts of methylethyl ketone, and the resulting mixture was blended and agitated to form a homogeneous pigment dispersion. The pigment dispersion was dropped in 2000 parts of water maintained at 15° C. and agitated at a high speed to emulsify the pigment dispersion, extract the solvent into water and form resin particles. Filtration and water washing were repeated to obtain a water-containing cake of resin particles having an average particle size about 100μ. The water content in the cake was about 50%. To 100 parts of the so obtained water-containing cake were added 0.25 part of a 40% aqueous solution of a non-ionic surface active agent (manufactured and sold under the tradename "Emalgen 930" by Kao Atlas Co. Ltd. and having an HLB value of 15.1) and 1.5 parts of a 10% aqueous solution of a thickener composed of an alkali metal salt of an acrylic acid type copolymer, and the mixture was dispersed by a sand mill to finely pulverize the resin particles. A slurry paint containing resin particles having an average particle size of 15μ and having a pH value of 7.7 was thus obtained.

EXAMPLE 20

To 24 parts of the resin solution PE-AV-4 were added 12 parts of titanium dioxide, 0.5 part of a flow modifier (manufactured and sold under the tradename "Modaflow" by Monsanto Chemical Co. Ltd.) and 4.0 parts of methylethyl ketone, and the mixture was dispersed by a sand mill so that the dispersed particle size was smaller than 10μ. The dispersed mixture was mixed with 24 parts of the resin solution PE-AV-4, 32 parts of the resin solution PV-6 and 3.5 parts of methylethyl ketone, and the mixture was blended and agitated to form a homogeneous pigment dispersion. The pigment dispersion was dropped in 2000 parts of water maintained at 15° C. and agitated at a high speed to emulsify the pigment dispersion, extract the solvent into water and form resin particles. Filtration and water washing were repeated to obtain a water-containing cake of resin particles having an average particle size of about 100μ. The water content in the cake was about 50%. To 100 parts of the so obtained water-containing cake were added 0.2 part of a 40% aqueous solution of a non-ionic surface active agent (manufactured and sold under the tradename "Emalgen 930" by Kao Atlas Co. Ltd. and having an HLB value of 15.1) and 1.5 parts of a 10% aqueous solution of a thickener composed of an alkali metal salt of an acrylic acid type copolymer, and the mixture was dispersed by a sand mill to finely pulverize the resin particles. A slurry paint containing resin particles having an average particle size of 16μ and having a pH value of 7.5 was thus obtained.

COMPARATIVE EXAMPLE 7

The reaction was carried out in the same manner as described above for the preparation of the polyester-modified vinyl resin solution PE-AV-1 used in Example 14 except that the modifying polyester resin PE-1 was not used and N-n-butoxymethyl acrylamide was not added, to obtain a resin solution having a non-volatile compoent content of 58.4%. The resin was found to have an acid value of 12.3, a hydroxyl value of 27 and a weight average molecular weight of 71,500. To 24 parts of the so formed resin solution were added 12 parts of titanium dioxide and 4.5 parts of methylethyl ketone, and the mixture was dispersed by a sand mill so that the dispersed particle size was smaller than 10μ. The dispersed mixture was mixed with 44 parts of the above resin solution, 12 parts of a 60% methylethyl ketone solution of a butylated methylol-melamine resin having an average condensation degree of 2.5, an etherification degree of 2.5 and a water-soluble component content lower than 1% and 3.5 parts of methylethyl ketone, and the resulting mixture was blended and agitated to form a homogeneous pigment dispersion. The subsequent operations were conducted in the same manner as described in Example 14, to obtain a slurry paint containing resin particles having an average particle size of 15μ and having a pH value of 7.5.

COMPARATIVE EXAMPLE 8

The reaction was carried out in the same manner as described above for the preparation of the polyester-modified vinyl resin PE-AV-3 used in Example 16 except that the polyester resin PE-2 was not used and N-n-butoxymethyl acrylamide was not added, to obtain a resin solution having a non-volatile component content of 59.1%. The resin was found to have an acid value of 12.2, a hydroxyl value of 33 and a weight average molecular weight of 16,200. To 24 parts of the so formed resin solution were added 12 parts of titanium dioxide and 4.5 parts of methylethyl ketone, and the mixture was dispersed by a ball mill so that the dispersed particle size was smaller than 10μ. The dispersed mixture was mixed with 48 parts of the above resin solution, 8 parts of a blocked isocyanate resin (manufactured and sold under the tradename "Crelan Ue 6109" by Bayer AG), 0.5 part of dibutyltin dilaurate (dissociation catalyst) and 3 parts of methylethyl ketone. The resulting mixture was blended and aditated to form a homogeneous pigment dispersion. The subsequent operations were conducted in the same manner as described in Example 16, to obtain a slurry paint containing resin particles having an average particle size of 15μ and having a pH value of 7.3.

COMPARATIVE EXAMPLE 9

The reaction was carried out in the same manner as described above for the preparation of the polyester-modified vinyl resin solution PE-AV-1 used in Example 14 except that the modifying polyester resin PE-1 was not used, to form a resin solution having a non-volatile component content of 58.7%. The resin was found to have an acid value of 13.6, a hydroxyl value of 30.5 and a weight average molecular weight of 41,000. To 24 parts of the so obtained resin solution were added 12 parts of titanium dioxide and 4.5 parts of methylethyl ketone, and the mixture was dispersed by a ball mill so that the dispersed particle size was smaller than 10μ. The dispersed mixture was mixed with 56 parts of the above resin solution and 3.5 parts of methylethyl ketone, and the resulting mixture was blended and agitated to form a homogeneous pigment dispersion. The subsequent operations were conducted in the same manner as described in Example 14, to obtain a slurry paint containing resin particles having an average particle size of 15μ and having a pH value of 7.4.

The slurry paints prepared in Examples 14 to 20 and Comparative Examples 7 to 9 were independently spray-coated on polished soft steel plates, set for 5 minutes, pre-heated at 90° C. for 10 minutes and heated and dried at a predetermined temperature to obtain coatings having a thickness of about 35μ. The baking conditions and results of tests of physical properties of the coatings are shown in Table 3.

TABLE 3

| | Example 14 | Example 15 | Example 16 | Example 17 | Example 18 | Example 19 | Example 20 | Comparative Example 7 | Comparative Example 8 | Comparative Example 9 |
|---|---|---|---|---|---|---|---|---|---|---|
| Baking Conditions | | | | | | | | | | |
| Temperature (°C.) | 170 | 160 | 170 | 200 | 180 | 190 | 190 | 160 | 170 | 180 |
| Time (minutes) | 20 | 20 | 20 | 20 | 20 | 20 | 20 | 20 | 20 | 20 |
| Appearance of Coating | | | | | | | | | | |
| Flash rusting | none | none | none | none | none | none | none | observed | observed | observed |
| Popping | none | none | none | none | none | none | none | observed | none | none |
| Yellowing resistance | good | good | good | good | good | good | good | good | poor | good |
| Gloss | 88 | 86 | 89 | 88 | 89 | 89 | 88 | 88 | 88 | 87 |
| Physical Properties of Coating | | | | | | | | | | |
| Pencil hardness | 2H | 2H | 2H | 3H | 2H | 3H | 2H | 3H | H | H |
| Adhesion | 100/100 | 100/100 | 100/100 | 100/100 | 100/100 | 100/100 | 100/100 | 40/100 | 65/100 | 70/100 |
| Erichsen test | 5< | 5< | 5< | 5< | 5< | 5< | 5< | 2.0 | 3.0 | 3.5 |
| Impact resistance | 50 | 50 | 50 | 40 | 50 | 50 | 50 | 10 | 10 | 10> |
| Solvent resistance | O | O | | | | | | | O | X |
| Adhesion after humidity resistance test | | | | | | | | x | O | x |
| Adhesion after salt spray resistance test | O | | | | | | | X | X | X |
| Storage Stability of | 10< | 10< | 10< | 10< | 10< | 10< | 10< | 6 | 5 | 5 |

TABLE 3-continued

| | Example 14 | Example 15 | Example 16 | Example 17 | Example 18 | Example 19 | Example 20 | Comparative Example 7 | Comparative Example 8 | Comparative Example 9 |
|---|---|---|---|---|---|---|---|---|---|---|
| Composition | | | | | | | | | | |

Note
The respective items are the same as described in Tables 1 and 2.

What is claimed is:

1. An aqueous dispersion type thermosetting coating composition comprising (A) fine [thermosetting] water-insoluble *thermosetting* resin particles consisting essentially of (a) a preformed polyester-modified vinyl resin having a hydroxyl value of 30 to 200, which is formed by solution graft-polymerizing (i) an unsaturated polyester resin formed by [reaction between an] *reacting 1-10% by weight of at least one* α,β-unsaturated dicarboxylic acid, *at least one carboxylic acid component selected from the group consisting of phthalic acid, phthalic anhydride, isophthalic acid, isophthalic anhydride, trimellitic acid, trimellitic anhydride, pyromellitic acid, pyromellitic anhydride, tetrahydrophthalic acid, tetrahydrophthalic anhydride, hexahydrophthalic acid, hexahydrophthalic anhydride, methylhexahydrophthalic acid, methylhexahydrophthalic anhydride, 3,6-endomethylene-tetrahydrophthalic anhydride, succinic acid, succinic anhydride, adipic acid, sebacic acid, benzoic acid and p-tert-butyl-benzoic acid* and [a] *at least one* polyhydric alcohol, with (ii) at least one α,β-monoethylenically unsaturated monomer, and optionally with (iii) a phosphoric acid group-containing α,β-monoethylenically unsaturated monomer, and (b) a performed cross-linkable copolymer resin derived from a monomer mixture comprising (iv) an N-alkoxymethylated monomer of an α,β-monoethylenically unsaturated carboxylic acid amide and (ii) at least one α,β-monoethylenically unsaturated monomer, (B) a surface active agent and/or a thickener, and (C) a necessary amount of water.

2. An aqueous dispersion type thermosetting coating composition as set forth in claim 1, wherein said (A) fine water-insoluble thermosetting resin particles consist essentially of 5 to 90% by weight of said polyester-modified vinyl resin having a hydroxyl value of 30 to 200, which is formed by solution graft-polymerizing (i) 5 to 50% by weight of said unsaturated polyester resin with (ii) 95 to 50% by weight of at least one said α,β-monoethylenically unsaturated monomer and 95 to 10% by weight of said cross-linkable copolymer resin, and said (B) surface active agent and/or thickener is present in an amount of [0.1] *0.01* to 1.0% by weight based on said resin particles.

[3. An aqueous dispersion type thermosetting coating composition as set forth in claim 2 wherein said unsaturated polyester resin comprises 1 to 10% by weight of at least one α,β-unsaturated dicarboxylic acid as one constituent.]

4. An aqueous dispersion type thermosetting coating composition as set forth in claim 2 wherein the α,β-monoethylenically unsaturated monomer graft-polymerized with said unsaturated polyester resin is a monomer mixture comprising (ii)' 5 to 50% by weight of a hydroxyalkyl ester of an α,β-monoethylenically unsaturated carboxylic acid and (ii)'' 95 to 50% by weight of a copolymerizable α,β-monoethylenically unsaturated monomer other than said monomer (ii)'.

5. An aqueous dispersion type thermosetting coating composition as set forth in claim 2 wherein said cross-linkable copolymer resin is derived from a monomer mixture comprising (iv) 5 to 30% by weight of an N-alkoxymethylated monomer of an α,β-monoethylenically unsaturated carboxylic acid amide, (ii)''' 0.5 to 10% by weight an α,β-monoethylenically unsaturated carboxylic acid and (ii)'''' 60 to 90% by weight of a copolymerizable α,β-monoethylenically unsaturated monomer other than said monomers (iv) and (ii)'''.

6. An aqueous dispersion type thermosetting coating composition as set forth in claim 1 wherein said (A) fine water-insoluble thermosetting resin particles consist essentially of (a) 5 to 90% by weight of said polyester-modified vinyl resin having a hydroxy value of 30 to 200, which is formed by solution graft-polymerizing (i) 2 to 50% by weight of said unsaturated polyester resin with (ii) 95 to 40% by weight of at least one said α,β-monoethylenically unsaturated monomer and (iii) 0.01 to 10% by weight of said phosphoric acid group-containing α,β-monoethylenically unsaturated monomer and (b) 95 to 10% by weight of said cross-linkable copolymer resin, and said (B) surface active agent and/or thickener is present in an amount of 0.01 to 1.0% by weight based on said resin particles.

[7. An aqueous dispersion type thermosetting coating composition as set forth in claim 6 wherein said unsaturated polyester resin comprises 1 to 10% by weight of at least one α,β-unsaturated dicarboxylic acid as one constituent.]

8. An aqueous dispersion type thermosetting coating composition as set forth in claim 6 wherein the α,β-monoethylenically unsaturated monomer graft-polymerized with said unsaturated polyester resin is a monomer mixture comprising (ii)' 1 to 40% by weight of a hydroxyalkyl ester of an α,β-monoethylenically unsaturated carboxylic acid and (ii)'' 99 to 60% by weight of a copolymerizable α,β-monoethylenically unsaturated monomer other than said monomer (ii)'.

9. An aqueous dispersion type thermosetting coating composition as set forth in claim 6 wherein said cross-linkable copolymer resin is derived from a monomer mixture comprising (iv) 5 to 30% by weight of an N-alkoxymethylated monomer of an α,β-monoethylenically unsaturated carboxylic acid, (ii)''' 0.5 to 10% by weight of an α,β-monoethylenically unsaturated carboxylic acid and (ii)'''' 60 to 90% by weight of a copolymerizable α,β-monoethylenically unsaturated monomer other than said monomers (iv) and (ii)'''.

10. An aqueous dispersion type thermosetting coating composition which comprises (A) fine water-insoluble thermosetting resin particles consisting essentially of (a) 15 to 95% by weight of a preformed polyester-modified vinyl resin having a hydroxyl value of 10 to 150, which is formed by solution graft-polymerizing (i) 2 to 40% by weight of an unsaturated polyester resin formed by [reaction between an] *reacting 1-10% by weight of at least one* α,β-unsaturated dicarboxylic acid, *at least one carboxylic acid component selected from the group consisting of phthalic acid, phthalic anhydride, isophthalic acid, isophthalic anhydride, trimellitic acid, trimellitic anhydride, pyromellitic acid, pyromellitic anhydride, tetrahy-*

*drophthalic acid, tetrahydrophthalic anhydride, hexahydrophthalic acid, hexahydrophthalic anhydride, methylhexahydrophthalic acid, methylhexahydrophthalic anhydride, 3,6-endomethylene-tetrahydrophthalic anhydride, succinic acid, succinic anhydride, adipic acid, sebacic acid, benzoic acid and p-tert-butyl-benzoic acid* and [a] *at least one* polyhydric alcohol with 98 to 60% by weight of a monomer mixture comprising (iv) an N-alkoxymethylated monomer of an α,β-monoethylenically unsaturated carboxylic acid amide and (ii) at least one α,β-monoethylenically unsaturated monomer and (b) 85 to 5% by weight of a preformed phosphoric acid group-containing copolymer resin derived from a monomer mixture comprising (iii) a phosphoric acid group-containing α,β-monoethylenically unsaturated monomer and (ii) at least one α,β-monoethylenically unsaturated monomer, (B) a surface active agent and/or a thickener in an amount of 0.01 to 1.0% by weight based on said resin particles and (C) a necessary amount of water.

[11. An aqueous dispersion type thermosetting coating composition as set forth in claim 10 wherein said unsaturated polyester resin comprises 1 to 10% by weight of at least one α,β-unsaturated dicarboxylic acid as one constituent.]

12. An aqueous dispersion type thermosetting coating composition as set forth in claim 10 where the α,β-monoethylenically unsaturated monomer mixture graft-polymerized with said unsaturated polyester resin comprises (ii)' 1 to 30% by weight of a hydroxyalkyl ester of an α,β-monoethylenically unsaturated carboxylic acid, (iv) 5 to 30% by weight of an N-alkoxymethylated monomer of an α,β-monoethylenically unsaturated carboxylic acid amide and (ii)'' 60 to 90% by weight of a copolymerizable α,β-monoethylenically unsaturated monomer other than said monomers (iv) and (ii)'.

13. An aqueous dispersion type thermosetting coating composition as set forth in claim 10 wherein said phosphoric acid group-containing copolymer resin is derived from a monomer mixture comprising (iii) 0.01 to 10% by weight of a phosphoric acid group-containing α,β-monoethylenically unsaturated monomer, (ii)''' 0.5 to 10% by weight of an α,β-monoethylenically unsaturated carboxylic acid, (ii)' 1 to 30% by weight of a hydroxyalkyl ester of an α,β-monoethylenically unsaturated carboxylic acid and (ii)'' 70 to 90% by weight of a copolymerizable α,β-monoethylenically unsaturated monomer other than said monomers (iii), (ii)''' and (ii)'.

*14. An aqueous dispersion type thermosetting coating composition as set forth in claim 1 wherein 30–70% by weight of the polyhydric alcohol is reacted.*

*15. An aqueous dispersion type thermosetting coating composition as set forth in claim 14 wherein 29–69% by weight of said carboxylic acid component is reacted.*

*16. An aqueous dispersion type thermosetting coating composition as set forth in claim 14, wherein said (A) fine water-insoluble thermosetting resin particles consist essentially of 5 to 90% by weight of said polyester-modified vinyl resin having a hydroxyl value of 30 to 200, which is formed by solution graft-polymerizing (i) 5 to 50% by weight of said unsaturated polyester resin with (ii) 95 to 50% by weight of at least one said α,β-monoethylenically unsaturated monomer and 95 to 10% by weight of said cross-linkable copolymer resin, and said (B) surface active agent and/or thickener is present in an amount of 0.01 to 1.0% by weight based on said resin particles.*

*17. An aqueous dispersion type thermosetting coating composition as set forth in claim 14 wherein the α,β-monoethylenically unsaturated monomer graft-polymerized with said unsaturated polyester resin is a monomer mixture comprising (ii)' 5 to 50% by weight of a hydroxyalkyl ester of an α,β-monoethylenically unsaturated carboxylic acid and (ii)'' 95 to 50% by weight of a copolymerizable α,β-monoethylenically unsaturated monomer other than said monomer (ii)'.*

*18. An aqueous dispersion type thermosetting coating composition as set forth in claim 14 wherein said cross-linkable copolymer resin is derived from a monomer mixture comprising (iv) 5 to 30% by weight of an N-alkoxymethylated monomer of an α,β-monoethylenically unsaturated carboxylic acid amide, (ii)''' 0.5 to 10% by weight of an α,β-monoethylenically unsaturated carboxylic acid and (ii)'''' 60 to 90% by weight of a copolymerizable α,β-monoethylenically unsaturated monomer other than said monomers (iv) and (ii)'''.*

*19. An aqueous dispersion type thermosetting coating composition as set forth in claim 14 wherein said (A) fine water-insoluble thermosetting resin particles consist essentially of (a) 5 to 90% by weight of said polyester-modified vinyl resin having a hydroxy value of 30 to 200, which is formed by solution graft-polymerizing (i) 2 to 50% by weight of said unsaturated polyester resin with (ii) 95 to 40% by weight of at least one said α,β-monoethylenically unsaturated monomer and (iii) 0.01 to 10% by weight of said phosphoric acid group-containing α,β-monoethylenically unsaturated monomer and (b) 95 to 10% by weight of said cross-linkable copolymer resin, and said (B) surface active agent and/or thickener is present in an amount of 0.01 to 1.0% by weight based on said resin particles.*

*20. An aqueous dispersion type thermosetting coating composition as set forth in claim 15 wherein said (A) fine water-insoluble thermosetting resin particles consist essentially of 5 to 90% by weight of said polyester-modified vinyl resin having a hydroxyl value of 30 to 200, which is formed by solution graft-polymerizing (i) 5 to 50% by weight of said unsaturated polyester resin with (ii) 95 to 50% by weight of at least one said α,β-monoethylenically unsaturated monomer and 95 to 10% by weight of said cross-linkable copolymer resin, and said (B) surface active agent and/or thickener is present in an amount of 0.01 to 1.0% by weight based on said resin particles.*

*21. An aqueous dispersion type thermosetting coating composition as set forth in claim 15 wherein the α,β-monoethylenically unsaturated monomer graft-polymerized with said unsaturated polyester resin is a monomer mixture comprising (ii)' 5 to 50% by weight of a hydroxyalkyl ester of an α,β-monoethylenically unsaturated carboxylic acid and (ii)'' 95 to 50% by weight of a copolymerizable α,β-monoethylenically unsaturated monomer other than said monomer (ii)'.*

*22. An aqueous dispersion type thermosetting coating composition as set forth in claim 15 wherein said cross-linkable copolymer resin is derived from a monomer mixture comprising (iv) 5 to 30% by weight of an N-alkoxymethylated monomer of an α,β-monoethylenically unsaturated carboxylic acid amide, (ii)''' 0.5 to 10% by weight of an α,β-monoethylenically unsaturated carboxylic acid and (ii)'''' 60 to 90% by weight of a copolymerizable α,β-monoethylenically unsaturated monomer other than said monomers (iv) and (ii)'''.*

*23. An aqueous dispersion type thermosetting coating composition as set forth in claim 15 wherein said (A) fine water-insoluble thermosetting resin particles consist essentially of (a) 5 to 90% by weight of said polyester-modified vinyl resin having a hydroxy value of 30 to 200, which is formed by solution graft-polymerizing (i) 2 to 50% by weight of said unsaturated polyester resin with (ii) 95 to*

*40% by weight of at least one said α,β-monoethylenically unsaturated monomer and (iii) 0.01 to 10% by weight of said phosphoric acid group-containing α,β-monoethylenically unsaturated monomer and (b) 95 to 10% by weight of said cross-linkable copolymer resin, and said (B) surface active agent and/or thickener is present in an amount of 0.01 to 1.0% by weight based on said resin particles.*

*24. An aqueous dispersion type thermosetting coating composition as set forth in claim 19, wherein the α,β-monoethylenically unsaturated monomer graft-polymerized with said unsaturated polyester resin is a monomer mixture comprising (ii)' 1 to 40% by weight of a hydroxyalkyl ester of an α,β-monoethylenically unsaturated carboxylic acid and (ii)" 99 to 66% by weight of a copolymerizable α,β-monoethylenically unsaturated monomer other than said monomer (ii)'.*

*25. An aqueous dispersion type thermosetting coating composition as set forth in claim 19 wherein said cross-linkable copolymer resin is derived from a monomer mixture comprising (iv) 5 to 30% by weight of an N-alkoxymethylated monomer of an α,β-monoethylenically unsaturated carboxylic acid, (ii)''' 0.5 to 10% by weight of an α,β-monoethylenically unsaturated carboxylic acid and (ii)'''' 60 to 90% by weight of a copolymerizable α,β-monoethylenically unsaturated monomer other than said monomers (iv) and (ii)'''.*

*26. An aqueous dispersion type thermosetting coating composition as set forth in claim 23 wherein the α,β-monoethylenically unsaturated monomer graft-polymerized with said unsaturated polyester resin is a monomer mixture comprising (ii)' 1 to 40% by weight of a hydroxyalkyl ester of an α,β-monoethylenically unsaturated carboxylic acid and (ii)' 99 to 66% by weight of a copolymerizable α,β-monoethylenically unsaturated monomer other than said monomer (ii)'.*

*27. An aqueous dispersion type thermosetting coating composition as set forth in claim 23 wherein said cross-linkable copolymer resin is derived from a monomer mixture comprising (iv) 5 to 30% by weight of an N-alkoxymethylated monomer of an α,β-monoethylenically unsaturated carboxylic acid, (ii)''' 0.5 to 10% by weight of an α,β-monoethylenically unsaturated carboxylic acid and (ii)'''' 60 to 90% by weight of a copolymerizable α,β-monoethylenically unsaturated monomer other than said monomers (iv) and (ii)'''.*

*28. An aqueous dispersion type thermosetting coating composition as set forth in claim 10 wherein 30–70% by weight of the polyhydric alcohol is reacted.*

*29. An aqueous dispersion type thermosetting coating composition as set forth in claim 28 wherein 29–69% by weight of said carboxylic acid component is reacted.*

*30. An aqueous dispersion type thermosetting coating composition as set forth in claim 28 wherein the α,β-monoethylenically unsaturated monomer mixture graft-polymerized with said unsaturated polyester resin comprises (ii)' 1 to 30% by weight of a hydroxyalkyl ester of an α,β-monoethylenically unsaturated carboxylic acid, (iv) 5 to 30% by weight of an N-alkoxymethylated monomer of an α,β-monoethylenically unsaturated carboxylic acid amide and (ii)" 60 to 90% by weight of a copolymerizable α,β-monoethylenically unsaturated monomer other than said monomers (iv) and (ii)".*

*31. An aqueous dispersion type thermosetting coating composition as set forth in claim 29 wherein the α,β-monoethylenically unsaturated monomer mixture graft-polymerized with said unsaturated polyester resin comprises (ii)' 1 to 30% by weight of a hydroxyalkyl ester of an α,β-monoethylenically unsaturated carboxylic acid, (iv) 5 to 30% by weight of an N-alkoxymethylated monomer of an α,β-monoethylenically unsaturated carboxylic acid amide and (ii)" 60 to 90% by weight of a copolymerizable α,β-monoethylenically unsaturated monomer other than said monomers (iv) and (ii)".*

*32. An aqueous dispersion type thermosetting coating as set forth in claim 28 wherein said phosphoric acid group-containing copolymer resin is derived from a monomer mixture comprising (iii) 0.01 to 10% by weight of a phosphoric acid group-containing α,β-monoethylenically unsaturated monomer, (ii)''' 0.5 to 10% by weight of an α,β-monoethylenically unsaturated carboxylic acid, (ii)' 1 to 30% by weight of a hydroxyalkyl ester of an α,β-monoethylenically unsaturated carboxylic acid and (ii)" 70 to 90% by weight of a copolymerizable α,β-monoethylenically unsaturated monomer other than said monomers (iii), (ii)''' and (ii)'.*

*33. An aqueous dispersion type thermosetting coating composition as set forth in claim 29 wherein said phosphoric acid group-containing copolymer resin is derived from a monomer mixture comprising (iii) 0.01 to 10% by weight of a phosphoric acid group-containing α,β-monoethylenically unsaturated monomer, (ii)''' 0.5 to 10% by weight of an α,β-monoethylenically unsaturated carboxylic acid, (ii)' 1 to 30% by weight of a hydroxyalkyl ester of an α,β-monoethylenically unsaturated carboxylic acid and (ii)" 70 to 90% by weight of a copolymerizable α,β-monoethylenically unsaturated monomer other than said monomers (iii), (ii)''' and (ii)'.*

* * * * *